(12) United States Patent
Lipkens et al.

(10) Patent No.: US 10,737,953 B2
(45) Date of Patent: *Aug. 11, 2020

(54) ACOUSTOPHORETIC METHOD FOR USE IN BIOREACTORS

(71) Applicant: FloDesign Sonics, Inc., Wilbraham, MA (US)

(72) Inventors: Bart Lipkens, Hampden, MA (US); Thomas J. Kennedy, III, Wilbraham, MA (US)

(73) Assignee: FloDesign Sonics, Inc., Wilbraham, MA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/666,510

(22) Filed: Aug. 1, 2017

(65) Prior Publication Data
US 2017/0355623 A1  Dec. 14, 2017

Related U.S. Application Data

(63) Continuation-in-part of application No. 13/866,943, filed on Apr. 19, 2013, now Pat. No. 9,718,708.
(Continued)

(51) Int. Cl.
*C02F 1/36* (2006.01)
*C02F 1/24* (2006.01)
(Continued)

(52) U.S. Cl.
CPC ............ *C02F 1/36* (2013.01); *B01D 21/0027* (2013.01); *B01D 21/283* (2013.01); *B06B 1/06* (2013.01);
(Continued)

(58) Field of Classification Search
USPC ................ 55/15, 277; 73/432.1, 570, 570.5; 75/710; 137/1, 544; 204/152.42, 157.15,
(Continued)

(56) References Cited

U.S. PATENT DOCUMENTS 2,473,971 A  6/1949  Ross
2,667,944 A  2/1954  Crites
(Continued)

FOREIGN PATENT DOCUMENTS

AU  2002236405  9/2002
CN  105 087 788 A  11/2015
(Continued)

OTHER PUBLICATIONS

Alvarez et al.; Shock Waves, vol. 17, No. 6, pp. 441-447, 2008.
(Continued)

*Primary Examiner* — Hayden Brewster
(74) *Attorney, Agent, or Firm* — FloDesign Sonics, Inc.

(57) ABSTRACT

A system for enhancing the separation of particles or fluids from water is disclosed. A tank or bioreactor is provided with an open submersible acoustophoretic separator. The separator captures and holds fluid droplets or particles such as cells, permitting them to coalesce or agglomerate until they are large enough and have sufficient buoyant or weight force to float/sink to the top/bottom of the tank or bioreactor. In a tank or bioreactor, the separator captures and holds particles until they are large enough that their weight causes them to settle out of the host fluid. The acoustophoretic device thus speeds up separation of the particles or droplets from the host fluid.

20 Claims, 15 Drawing Sheets

Related U.S. Application Data

(60) Provisional application No. 61/636,546, filed on Apr. 20, 2012.

(51) Int. Cl.
*C02F 1/52* (2006.01)
*B01D 21/00* (2006.01)
*B01D 21/28* (2006.01)
*B06B 1/06* (2006.01)
*H04R 17/10* (2006.01)
*H04R 17/00* (2006.01)
*C02F 11/12* (2019.01)

(52) U.S. Cl.
CPC ............. *C02F 1/24* (2013.01); *C02F 1/52* (2013.01); *H04R 17/005* (2013.01); *H04R 17/10* (2013.01); *C02F 11/12* (2013.01); *C02F 2201/008* (2013.01)

(58) Field of Classification Search
USPC .... 204/193, 573, 661, 666; 209/1, 155–159; 210/188, 193, 251, 523, 708, 738, 748.05; 252/349; 266/170; 310/337; 366/127; 367/137, 138, 142, 191; 406/198; 422/1, 422/20, 128; 435/71.1
See application file for complete search history.

(56) References Cited

U.S. PATENT DOCUMENTS

| | | | |
|---|---|---|---|
| 3,372,370 A | 3/1968 | Cyr |
| 3,555,311 A | 1/1971 | Weber |
| 4,055,491 A | 10/1977 | Porath-Furedi |
| 4,065,875 A | 1/1978 | Srna |
| 4,118,649 A | 10/1978 | Schwartzman et al. |
| 4,158,629 A | 6/1979 | Sawyer |
| 4,165,273 A | 8/1979 | Azarov et al. |
| 4,173,725 A | 11/1979 | Asai et al. |
| 4,204,096 A | 5/1980 | Barcus et al. |
| 4,254,661 A | 3/1981 | Kossoff et al. |
| 4,320,659 A | 3/1982 | Lynnworth et al. |
| 4,344,448 A | 8/1982 | Potts |
| 4,398,325 A | 8/1983 | Piaget et al. |
| 4,552,669 A | 11/1985 | Sekellick |
| 4,666,595 A | 5/1987 | Graham |
| 4,673,512 A | 6/1987 | Schram |
| 4,699,588 A | 10/1987 | Zinn et al. |
| 4,743,361 A | 5/1988 | Schram |
| 4,759,775 A | 7/1988 | Peterson et al. |
| 4,800,316 A | 1/1989 | Wang |
| 4,821,838 A | 4/1989 | Chen |
| 4,836,684 A | 6/1989 | Javorik et al. |
| 4,860,993 A | 8/1989 | Goode |
| 4,878,210 A | 10/1989 | Mitome |
| 4,983,189 A | 1/1991 | Peterson et al. |
| 5,059,811 A | 10/1991 | King et al. |
| 5,062,965 A | 11/1991 | Bernou et al. |
| 5,085,783 A | 2/1992 | Feke et al. |
| 5,164,094 A | 11/1992 | Stuckart |
| 5,225,089 A | 7/1993 | Benes et al. |
| 5,371,429 A | 12/1994 | Manna |
| 5,395,592 A | 3/1995 | Bolleman et al. |
| 5,431,817 A | 7/1995 | Braatz et al. |
| 5,443,985 A | 8/1995 | Lu et al. |
| 5,452,267 A | 9/1995 | Spevak |
| 5,475,486 A | 12/1995 | Paoli |
| 5,484,537 A | 1/1996 | Whitworth |
| 5,527,460 A | 6/1996 | Trampler et al. |
| 5,560,362 A | 10/1996 | Sliwa, Jr. et al. |
| 5,594,165 A | 1/1997 | Madanshetty |
| 5,604,301 A | 2/1997 | Mountford et al. |
| 5,626,767 A | 5/1997 | Trampler et al. |
| 5,688,405 A | 11/1997 | Dickinson et al. |
| 5,711,888 A | 1/1998 | Trampler et al. |
| 5,831,166 A | 11/1998 | Kozuka et al. |
| 5,834,871 A | 11/1998 | Puskas |
| 5,902,489 A | 5/1999 | Yasuda et al. |
| 5,912,182 A | 6/1999 | Coakley et al. |
| 5,947,299 A | 9/1999 | Vazquez et al. |
| 5,951,456 A | 9/1999 | Scott |
| 6,090,295 A | 6/2000 | Raghavarao et al. |
| 6,166,231 A | 12/2000 | Hoeksema |
| 6,216,538 B1 | 4/2001 | Yasuda et al. |
| 6,205,848 B1 | 6/2001 | Faber et al. |
| 6,273,262 B1 | 8/2001 | Yasuda et al. |
| 6,332,541 B1 | 12/2001 | Coakley et al. |
| 6,391,653 B1 | 5/2002 | Letcher et al. |
| 6,475,151 B2 | 11/2002 | Koger et al. |
| 6,482,327 B1 | 11/2002 | Mori et al. |
| 6,487,095 B1 | 11/2002 | Malik et al. |
| 6,592,821 B1 | 7/2003 | Wada et al. |
| 6,641,708 B1 | 11/2003 | Becker et al. |
| 6,649,069 B2 | 11/2003 | DeAngelis |
| 6,699,711 B1 | 3/2004 | Hahn et al. |
| 6,727,451 B1 | 4/2004 | Fuhr et al. |
| 6,763,722 B2 | 7/2004 | Fjield et al. |
| 6,881,314 B1 | 4/2005 | Wang et al. |
| 6,929,750 B2 | 8/2005 | Laurell et al. |
| 6,936,151 B1 | 8/2005 | Lock et al. |
| 7,008,540 B1 | 3/2006 | Weavers et al. |
| 7,010,979 B2 | 3/2006 | Scott |
| 7,061,163 B2 | 6/2006 | Nagahara et al. |
| 7,081,192 B1 | 7/2006 | Wang et al. |
| 7,093,482 B2 | 8/2006 | Berndt |
| 7,108,137 B2 | 9/2006 | Lal et al. |
| 7,150,779 B2 | 12/2006 | Meegan, Jr. |
| 7,186,502 B2 | 3/2007 | Vesey |
| 7,191,787 B1 | 3/2007 | Redeker et al. |
| 7,322,431 B2 | 1/2008 | Ratcliff |
| 7,331,233 B2 | 2/2008 | Scott |
| 7,340,957 B2 | 3/2008 | Kaduchak et al. |
| 7,373,805 B2 | 5/2008 | Hawkes et al. |
| 7,541,166 B2 | 6/2009 | Belgrader et al. |
| 7,601,267 B2 | 10/2009 | Haake et al. |
| 7,673,516 B2 | 3/2010 | Janssen et al. |
| 7,674,630 B2 | 3/2010 | Siversson |
| 7,837,040 B2 | 11/2010 | Ward et al. |
| 7,846,382 B2 | 12/2010 | Strand et al. |
| 7,968,049 B2 | 6/2011 | Takahashi et al. |
| 8,075,786 B2 | 12/2011 | Bagajewicz |
| 8,080,202 B2 | 12/2011 | Takahashi et al. |
| 8,134,705 B2 | 3/2012 | Kaduchak et al. |
| 8,256,076 B1 | 9/2012 | Feller |
| 8,266,950 B2 | 9/2012 | Kaduchak et al. |
| 8,273,253 B2 | 9/2012 | Curran |
| 8,273,302 B2 | 9/2012 | Takahashi et al. |
| 8,309,408 B2 | 11/2012 | Ward et al. |
| 8,319,398 B2 | 11/2012 | Vivek et al. |
| 8,334,133 B2 | 12/2012 | Fedorov et al. |
| 8,387,803 B2 | 3/2013 | Thorslund et al. |
| 8,592,204 B2 | 11/2013 | Lipkens et al. |
| 8,679,338 B2 | 3/2014 | Rietman et al. |
| 8,691,145 B2 | 4/2014 | Dionne et al. |
| 8,873,051 B2 | 10/2014 | Kaduchak et al. |
| 8,889,388 B2 | 11/2014 | Wang et al. |
| 9,272,234 B2 | 3/2016 | Lipkens et al. |
| 9,357,293 B2 | 5/2016 | Claussen |
| 9,365,815 B2 | 6/2016 | Miyazaki et al. |
| 9,368,110 B1 | 6/2016 | Hershey et al. |
| 9,388,363 B2 | 7/2016 | Goodson et al. |
| 9,391,542 B2 | 7/2016 | Wischnewskiy |
| 9,403,114 B2 | 8/2016 | Kusuura |
| 9,410,256 B2 | 8/2016 | Dionne et al. |
| 9,416,344 B2 | 8/2016 | Lipkens et al. |
| 9,421,553 B2 | 8/2016 | Dionne et al. |
| 9,422,328 B2 | 8/2016 | Kennedy, III et al. |
| 9,457,139 B2 | 10/2016 | Ward et al. |
| 9,457,302 B2 | 10/2016 | Lipkens et al. |
| 9,458,450 B2 | 10/2016 | Lipkens et al. |
| 9,464,303 B2 | 10/2016 | Burke |
| 9,476,855 B2 | 10/2016 | Ward et al. |
| 9,480,375 B2 | 11/2016 | Marshall et al. |
| 9,480,935 B2 | 11/2016 | Mariella, Jr. et al. |

(56) References Cited

U.S. PATENT DOCUMENTS

| | | |
|---|---|---|
| 9,488,621 B2 | 11/2016 | Kaduchak et al. |
| 9,504,780 B2 | 11/2016 | Spain et al. |
| 9,512,395 B2 | 12/2016 | Lipkens et al. |
| 9,513,205 B2 | 12/2016 | Yu et al. |
| 9,514,924 B2 | 12/2016 | Morris et al. |
| 9,517,474 B2 | 12/2016 | Mao et al. |
| 9,532,769 B2 | 1/2017 | Dayton et al. |
| 9,533,241 B2 | 1/2017 | Presz, Jr. et al. |
| 9,550,134 B2 | 1/2017 | Lipkens et al. |
| 9,550,998 B2 | 1/2017 | Williams |
| 9,556,271 B2 | 1/2017 | Blumberg et al. |
| 9,556,411 B2 | 1/2017 | Lipkens et al. |
| 9,566,352 B2 | 2/2017 | Holmes et al. |
| 9,567,559 B2 | 2/2017 | Lipkens et al. |
| 9,567,609 B2 | 2/2017 | Paschon et al. |
| 9,572,897 B2 | 2/2017 | Bancel et al. |
| 9,573,995 B2 | 2/2017 | Schurpf et al. |
| 9,574,014 B2 | 2/2017 | Williams et al. |
| 9,580,500 B2 | 2/2017 | Schurpf et al. |
| 9,587,003 B2 | 3/2017 | Bancel et al. |
| 9,597,357 B2 | 3/2017 | Gregory et al. |
| 9,597,380 B2 | 3/2017 | Chakraborty et al. |
| 9,605,074 B2 | 3/2017 | Shah |
| 9,605,266 B2 | 3/2017 | Rossi et al. |
| 9,606,086 B2 | 3/2017 | Ding et al. |
| 9,608,547 B2 | 3/2017 | Ding et al. |
| 9,611,465 B2 | 4/2017 | Handa et al. |
| 9,616,090 B2 | 4/2017 | Conway et al. |
| 9,623,348 B2 | 4/2017 | McCarthy et al. |
| 9,629,877 B2 | 4/2017 | Cooper et al. |
| D787,630 S | 5/2017 | Lipkens et al. |
| 9,644,180 B2 | 5/2017 | Kahvejian et al. |
| 9,645,060 B2 | 5/2017 | Fiering |
| 9,656,263 B2 | 5/2017 | Laurell et al. |
| 9,657,290 B2 | 5/2017 | Dimov et al. |
| 9,662,375 B2 | 5/2017 | Jensen et al. |
| 9,663,756 B1 | 5/2017 | Lipkens et al. |
| 9,670,477 B2 | 6/2017 | Lipkens et al. |
| 9,670,938 B2 | 6/2017 | Beliaysky |
| 9,675,668 B2 | 6/2017 | Bancel et al. |
| 9,675,902 B2 | 6/2017 | Lipkens et al. |
| 9,675,906 B2 | 6/2017 | Lipkens et al. |
| 9,677,055 B2 | 6/2017 | Jones et al. |
| 9,685,155 B2 | 6/2017 | Hershey et al. |
| 9,686,096 B2 | 6/2017 | Lipkens et al. |
| 9,688,958 B2 | 6/2017 | Kennedy, III et al. |
| 9,689,234 B2 | 6/2017 | Gregory et al. |
| 9,689,802 B2 | 6/2017 | Caseres et al. |
| 9,695,063 B2 | 7/2017 | Rietman et al. |
| 9,695,442 B2 | 7/2017 | Guschin et al. |
| 9,718,708 B2 * | 8/2017 | LoRicco .................. C02F 1/36 |
| 2002/0038662 A1 | 4/2002 | Schuler et al. |
| 2002/0134734 A1 | 9/2002 | Campbell et al. |
| 2003/0015035 A1 | 1/2003 | Kaduchak et al. |
| 2003/0028108 A1 | 2/2003 | Miller et al. |
| 2003/0195496 A1 | 10/2003 | Maguire |
| 2003/0209500 A1 | 11/2003 | Kock et al. |
| 2003/0230535 A1 | 12/2003 | Affeld et al. |
| 2004/0016699 A1 | 1/2004 | Bayevsky |
| 2004/0035208 A1 | 2/2004 | Diaz et al. |
| 2004/0112841 A1 | 6/2004 | Scott |
| 2004/0124155 A1 | 7/2004 | Meegan, Jr. |
| 2004/0149039 A1 | 8/2004 | Cardelius |
| 2005/0031499 A1 | 2/2005 | Meier |
| 2005/0121269 A1 | 6/2005 | Namduri |
| 2005/0145567 A1 | 7/2005 | Quintel et al. |
| 2005/0196725 A1 | 9/2005 | Fu |
| 2006/0037915 A1 | 2/2006 | Strand et al. |
| 2006/0037916 A1 | 2/2006 | Trampler |
| 2006/0050615 A1 | 3/2006 | Swisher |
| 2007/0053795 A1 | 3/2007 | Laugharn, Jr. et al. |
| 2007/0224676 A1 | 9/2007 | Haq |
| 2007/0267351 A1 | 11/2007 | Roach et al. |
| 2007/0272618 A1 | 11/2007 | Gou et al. |
| 2007/0284299 A1 | 12/2007 | Xu et al. |
| 2008/0011693 A1 | 1/2008 | Li et al. |
| 2008/0067128 A1 | 3/2008 | Hoyos et al. |
| 2008/0105625 A1 | 5/2008 | Rosenberg et al. |
| 2008/0181838 A1 | 7/2008 | Kluck |
| 2008/0217259 A1 | 9/2008 | Siversson |
| 2008/0245709 A1 | 10/2008 | Kaduchak et al. |
| 2008/0245745 A1 | 10/2008 | Ward et al. |
| 2008/0264716 A1 | 10/2008 | Kuiper et al. |
| 2008/0272034 A1 | 11/2008 | Ferren et al. |
| 2008/0272065 A1 | 11/2008 | Johnson |
| 2008/0316866 A1 | 12/2008 | Goodemote et al. |
| 2009/0029870 A1 | 1/2009 | Ward et al. |
| 2009/0048805 A1 | 2/2009 | Kaduchak et al. |
| 2009/0053686 A1 | 2/2009 | Ward et al. |
| 2009/0087492 A1 | 4/2009 | Johnson et al. |
| 2009/0098027 A1 | 4/2009 | Tabata et al. |
| 2009/0104594 A1 | 4/2009 | Webb |
| 2009/0126481 A1 | 5/2009 | Burris |
| 2009/0178716 A1 | 7/2009 | Kaduchak et al. |
| 2009/0194420 A1 | 8/2009 | Mariella, Jr. et al. |
| 2009/0227042 A1 | 9/2009 | Gauer et al. |
| 2009/0045107 A1 | 12/2009 | Ward et al. |
| 2009/0295505 A1 | 12/2009 | Mohammadi et al. |
| 2010/0000945 A1 | 1/2010 | Gavalas |
| 2010/0078323 A1 | 4/2010 | Takahashi et al. |
| 2010/0078384 A1 | 4/2010 | Yang |
| 2010/0124142 A1 | 5/2010 | Laugharn et al. |
| 2010/0139377 A1 | 6/2010 | Huang et al. |
| 2010/0192693 A1 | 8/2010 | Mudge et al. |
| 2010/0193407 A1 | 8/2010 | Steinberg et al. |
| 2010/0206818 A1 | 8/2010 | Leong et al. |
| 2010/0255573 A1 | 10/2010 | Bond et al. |
| 2010/0261918 A1 | 10/2010 | Chianelli et al. |
| 2010/0317088 A1 | 12/2010 | Radaelli et al. |
| 2010/0323342 A1 | 12/2010 | Gonzalez Gomez et al. |
| 2010/0330633 A1 | 12/2010 | Walther et al. |
| 2011/0003350 A1 | 1/2011 | Schafran et al. |
| 2011/0024335 A1 | 2/2011 | Ward et al. |
| 2011/0092726 A1 | 4/2011 | Clarke |
| 2011/0095225 A1 | 4/2011 | Eckelberry et al. |
| 2011/0123392 A1 | 5/2011 | Dionne et al. |
| 2011/0125024 A1 | 5/2011 | Mueller |
| 2011/0146678 A1 | 6/2011 | Ruecroft et al. |
| 2011/0154890 A1 | 6/2011 | Holm et al. |
| 2011/0166551 A1 | 7/2011 | Schafer |
| 2011/0189732 A1 | 8/2011 | Weinand et al. |
| 2011/0207225 A1 | 8/2011 | Mehta et al. |
| 2011/0245750 A1 | 10/2011 | Lynch et al. |
| 2011/0262990 A1 | 10/2011 | Wang et al. |
| 2011/0278218 A1 | 11/2011 | Dionne et al. |
| 2011/0281319 A1 | 11/2011 | Swayze et al. |
| 2011/0309020 A1 | 12/2011 | Rietman et al. |
| 2012/0088295 A1 | 4/2012 | Yasuda et al. |
| 2012/0145633 A1 | 6/2012 | Polizzotti et al. |
| 2012/0163126 A1 | 6/2012 | Campbell et al. |
| 2012/0175012 A1 | 7/2012 | Goodwin et al. |
| 2012/0231504 A1 | 9/2012 | Niazi |
| 2012/0267288 A1 | 10/2012 | Chen et al. |
| 2012/0325727 A1 | 12/2012 | Dionne et al. |
| 2012/0325747 A1 | 12/2012 | Reitman et al. |
| 2012/0328477 A1 | 12/2012 | Dionne et al. |
| 2012/0329122 A1 | 12/2012 | Lipkens et al. |
| 2013/0017577 A1 | 1/2013 | Arunakumari et al. |
| 2013/0115664 A1 | 5/2013 | Khanna et al. |
| 2013/0175226 A1 | 7/2013 | Coussios et al. |
| 2013/0217113 A1 | 8/2013 | Srinivasan et al. |
| 2013/0277316 A1 | 10/2013 | Dutra et al. |
| 2013/0277317 A1 | 10/2013 | LoRicco et al. |
| 2013/0284271 A1 | 10/2013 | Lipkens et al. |
| 2014/0011240 A1 * | 1/2014 | Lipkens ................ B01D 21/28 435/71.1 |
| 2014/0017758 A1 | 1/2014 | Kniep et al. |
| 2014/0102947 A1 | 4/2014 | Baym et al. |
| 2014/0141413 A1 | 5/2014 | Laugham, Jr. et al. |
| 2014/0154795 A1 | 6/2014 | Lipkens et al. |
| 2014/0319077 A1 | 10/2014 | Lipkens et al. |
| 2014/0329997 A1 | 11/2014 | Kennedy, III et al. |
| 2014/0377834 A1 | 12/2014 | Presz, Jr. et al. |
| 2015/0053561 A1 | 2/2015 | Ward et al. |

(56) References Cited

U.S. PATENT DOCUMENTS

| | | |
|---|---|---|
| 2015/0060581 A1 | 3/2015 | Santos et al. |
| 2015/0252317 A1 | 9/2015 | Lipkens et al. |
| 2015/0274550 A1 | 10/2015 | Lipkens et al. |
| 2015/0321129 A1 | 11/2015 | Lipkens et al. |
| 2016/0060615 A1 | 3/2016 | Walther et al. |
| 2016/0089620 A1 | 3/2016 | Lipkens et al. |
| 2016/0121331 A1 | 5/2016 | Kapur et al. |
| 2016/0123858 A1 | 5/2016 | Kapur et al. |
| 2016/0145563 A1 | 5/2016 | Berteau et al. |
| 2016/0153249 A1 | 6/2016 | Mitri |
| 2016/0175198 A1 | 6/2016 | Warner et al. |
| 2016/0184790 A1 | 6/2016 | Sinha et al. |
| 2016/0202237 A1 | 7/2016 | Zeng et al. |
| 2016/0208213 A1 | 7/2016 | Doyle et al. |
| 2016/0230168 A1 | 8/2016 | Kaduchak et al. |
| 2016/0237110 A1 | 8/2016 | Gilmanshin et al. |
| 2016/0237394 A1 | 8/2016 | Lipkens et al. |
| 2016/0237395 A1 | 8/2016 | Lipkens et al. |
| 2016/0252445 A1 | 9/2016 | Yu et al. |
| 2016/0279540 A1 | 9/2016 | Presz, Jr. et al. |
| 2016/0279551 A1 | 9/2016 | Foucault |
| 2016/0312168 A1 | 10/2016 | Pizzi |
| 2016/0314868 A1 | 10/2016 | El-Zahab et al. |
| 2016/0319270 A1 | 11/2016 | Lipkens et al. |
| 2016/0325039 A1 | 11/2016 | Leach et al. |
| 2016/0325206 A1 | 11/2016 | Presz, Jr. et al. |
| 2016/0332159 A1 | 11/2016 | Dual et al. |
| 2016/0339360 A1 | 11/2016 | Lipkens et al. |
| 2016/0347628 A1 | 12/2016 | Dionne et al. |
| 2016/0355776 A1 | 12/2016 | Lipkens et al. |
| 2016/0361670 A1 | 12/2016 | Lipkens et al. |
| 2016/0363579 A1 | 12/2016 | Lipkens et al. |
| 2016/0368000 A1 | 12/2016 | Dionne et al. |
| 2016/0369236 A1 | 12/2016 | Kennedy, III et al. |
| 2016/0370326 A9 | 12/2016 | Kaduchak et al. |
| 2017/0000413 A1 | 1/2017 | Clymer et al. |
| 2017/0002060 A1 | 1/2017 | Bolen et al. |
| 2017/0002839 A1 | 1/2017 | Burkland et al. |
| 2017/0007679 A1 | 1/2017 | Maeder et al. |
| 2017/0008029 A1 | 1/2017 | Lipkens et al. |
| 2017/0016025 A1 | 1/2017 | Poirot et al. |
| 2017/0016027 A1 | 1/2017 | Lee et al. |
| 2017/0020926 A1 | 1/2017 | Mata-Fink et al. |
| 2017/0029802 A1 | 2/2017 | Lipkens et al. |
| 2017/0035866 A1 | 2/2017 | Poirot et al. |
| 2017/0037386 A1 | 2/2017 | Jones et al. |
| 2017/0038288 A1 | 2/2017 | Ward et al. |
| 2017/0042770 A1 | 2/2017 | Warner et al. |
| 2017/0044517 A1 | 2/2017 | Lipkens et al. |
| 2017/0049949 A1 | 2/2017 | Gilmanshin et al. |
| 2017/0056448 A1 | 3/2017 | Glick et al. |
| 2017/0058036 A1 | 3/2017 | Ruiz-Opazo et al. |
| 2017/0065636 A1 | 3/2017 | Moriarty et al. |
| 2017/0066015 A1 | 3/2017 | Lipkens et al. |
| 2017/0067021 A1 | 3/2017 | Moriarty et al. |
| 2017/0067022 A1 | 3/2017 | Poirot et al. |
| 2017/0072405 A1 | 3/2017 | Mao et al. |
| 2017/0073406 A1 | 3/2017 | Schurpf et al. |
| 2017/0073423 A1 | 3/2017 | Juillerat et al. |
| 2017/0073638 A1 | 3/2017 | Campana et al. |
| 2017/0073684 A1 | 3/2017 | Rossi et al. |
| 2017/0073685 A1 | 3/2017 | Maeder et al. |
| 2017/0080070 A1 | 3/2017 | Weinschenk et al. |
| 2017/0081629 A1 | 3/2017 | Lipkens et al. |
| 2017/0088809 A1 | 3/2017 | Lipkens et al. |
| 2017/0088844 A1 | 3/2017 | Williams |
| 2017/0089826 A1 | 3/2017 | Lin |
| 2017/0096455 A1 | 4/2017 | Baric et al. |
| 2017/0107536 A1 | 4/2017 | Zhang et al. |
| 2017/0107539 A1 | 4/2017 | Yu et al. |
| 2017/0119820 A1 | 5/2017 | Moriarty et al. |
| 2017/0128523 A1 | 5/2017 | Ghatnekar et al. |
| 2017/0128857 A1 | 5/2017 | Lipkens et al. |
| 2017/0130200 A1 | 5/2017 | Moriarty et al. |
| 2017/0136168 A1 | 5/2017 | Spain et al. |
| 2017/0137491 A1 | 5/2017 | Matheson et al. |
| 2017/0137774 A1 | 5/2017 | Lipkens et al. |
| 2017/0137775 A1 | 5/2017 | Lipkens et al. |
| 2017/0137802 A1 | 5/2017 | Lipkens et al. |
| 2017/0145094 A1 | 5/2017 | Galetto |
| 2017/0151345 A1 | 6/2017 | Shah |
| 2017/0152502 A1 | 6/2017 | Scharenberg et al. |
| 2017/0152503 A1 | 6/2017 | Scharenberg et al. |
| 2017/0152504 A1 | 6/2017 | Scharenberg et al. |
| 2017/0152505 A1 | 6/2017 | Scharenberg et al. |
| 2017/0152527 A1 | 6/2017 | Paschon et al. |
| 2017/0152528 A1 | 6/2017 | Zhang et al. |
| 2017/0158749 A1 | 6/2017 | Cooper et al. |
| 2017/0159005 A1 | 6/2017 | Lipkens et al. |
| 2017/0159007 A1 | 6/2017 | Lipkens et al. |
| 2017/0166860 A1 | 6/2017 | Presz, Jr. et al. |
| 2017/0166877 A1 | 6/2017 | Bayle et al. |
| 2017/0166878 A9 | 6/2017 | Thanos et al. |
| 2017/0166903 A1 | 6/2017 | Zhang et al. |
| 2017/0173080 A1 | 6/2017 | Lee et al. |
| 2017/0173128 A1 | 6/2017 | Hoge et al. |
| 2017/0173498 A9 | 6/2017 | Lipkens et al. |
| 2017/0175073 A1 | 6/2017 | Lipkens et al. |
| 2017/0175125 A1 | 6/2017 | Welstead et al. |
| 2017/0175139 A1 | 6/2017 | Wu et al. |
| 2017/0175144 A1 | 6/2017 | Zhang et al. |
| 2017/0175509 A1 | 6/2017 | Abdel-Fattah et al. |
| 2017/0175720 A1 | 6/2017 | Tang et al. |
| 2017/0183390 A1 | 6/2017 | Springer et al. |
| 2017/0183413 A1 | 6/2017 | Galetto |
| 2017/0183418 A1 | 6/2017 | Galetto |
| 2017/0183420 A1 | 6/2017 | Gregory et al. |
| 2017/0184486 A1 | 6/2017 | Mach et al. |
| 2017/0189450 A1 | 7/2017 | Conway et al. |
| 2017/0190767 A1 | 7/2017 | Schurpf et al. |
| 2017/0191022 A1 | 7/2017 | Lipkens et al. |

FOREIGN PATENT DOCUMENTS

| | | |
|---|---|---|
| CN | 104722106 B | 4/2016 |
| DE | 30 27 433 A1 | 2/1982 |
| DE | 32 18 488 A1 | 11/1983 |
| DE | 196 48 519 A1 | 6/1998 |
| DE | 103 19 467 B3 | 7/2004 |
| DE | 10 2008 006 501 A1 | 9/2008 |
| DE | 10 2014 206 823 A1 | 10/2015 |
| EP | 0 292 470 B1 | 11/1988 |
| EP | 0 167 406 B1 | 7/1991 |
| EP | 0 641 606 | 3/1995 |
| EP | 1 175 931 A1 | 1/2002 |
| EP | 1 254 669 B1 | 11/2002 |
| EP | 1 308 724 A2 | 5/2003 |
| EP | 2 209 545 | 7/2010 |
| GB | 2 420 510 A | 5/2006 |
| JP | 9-136090 | 5/1997 |
| KR | 1442486 | 9/2014 |
| RU | 2085933 | 7/1997 |
| SU | 629496 | 10/1978 |
| WO | WO 1987/07178 A1 | 12/1987 |
| WO | WO 89/11899 A1 | 12/1989 |
| WO | WO 90/05008 | 3/1990 |
| WO | WO 95/01214 A1 | 1/1995 |
| WO | WO 97/34643 | 9/1997 |
| WO | WO 1998/017373 | 4/1998 |
| WO | WO 98/50133 A1 | 11/1998 |
| WO | WO 00/41794 | 7/2000 |
| WO | WO 02/072234 A1 | 9/2002 |
| WO | WO 02/072236 A1 | 9/2002 |
| WO | WO 03/089567 | 10/2003 |
| WO | WO 2004/079716 A1 | 9/2004 |
| WO | WO 2009/063198 | 5/2009 |
| WO | WO 2009/111276 A1 | 9/2009 |
| WO | WO 2009/144709 A1 | 12/2009 |
| WO | WO 2010/024753 A1 | 4/2010 |
| WO | WO 2010/040394 A1 | 4/2010 |
| WO | WO 2011/023949 A2 | 3/2011 |
| WO | WO 2011/025890 A1 | 3/2011 |
| WO | WO 2011/027146 A2 | 3/2011 |
| WO | WO 2011/131947 A2 | 10/2011 |

(56) References Cited

FOREIGN PATENT DOCUMENTS

| WO | WO 2011/161463 A2 | 12/2011 |
|---|---|---|
| WO | WO 2013/043044 A1 | 3/2013 |
| WO | WO 2013/043297 A1 | 3/2013 |
| WO | WO 2013/055517 A1 | 4/2013 |
| WO | WO 2013/0496323 | 4/2013 |
| WO | WO 2013/138797 A1 | 9/2013 |
| WO | WO 2013/148376 | 10/2013 |
| WO | WO 2013/159014 A1 | 10/2013 |
| WO | WO 2014/014941 A1 | 1/2014 |
| WO | WO 2014/029505 | 2/2014 |
| WO | WO 2014/046605 A1 | 3/2014 |
| WO | WO 2014/055219 A2 | 4/2014 |
| WO | WO 2014/124306 A1 | 8/2014 |
| WO | WO 2014/153651 | 10/2014 |
| WO | WO 2015/006730 | 1/2015 |
| WO | WO 2015/102528 | 7/2015 |
| WO | WO 2016/124542 | 8/2016 |
| WO | WO 2016/176663 A1 | 11/2016 |
| WO | WO 2016/209082 | 12/2016 |
| WO | WO 2017/041102 A1 | 3/2017 |

OTHER PUBLICATIONS

Augustsson et al. Acoustophoretic microfluidic chip for sequential elution of surface bound molecules from beads or cells, Biomicrofluidics, Sep. 2012, 6(3): 34115.
Benes et al.; Ultrasonic Separation of Suspended Particles, 2001 IEEE Ultrasonics Symposium; Oct. 7-10, 2001; pp. 649-659; Atlanta, Georgia.
Castilho et al.; Animal Cell Technology: From Biopharmaceuticals to Gene Therapy; 11—Animal Cell Separation; 2008.
Castro; Tunable gap and quantum quench dynamics in bilayer graphene; Jul. 13, 2010; Mathematica Summer School.
Chitale et al.; Understanding the Fluid Dynamics Associated with Macro Scale Ultrasonic Separators; Proceedings of Meetings on Acoustics, May 2015.
Cravotto et al.; Ultrasonics Sonochemistry, vol. 15, No. 5, pp. 898-902, 2008.
Garcia-Lopez, et al; Enhanced Acoustic Separation of Oil-Water Emulsion in Resonant Cavities. The Open Acoustics Journal. 2008, vol. 1, pp. 66-71.
Grenvall et al.; Concurrent Isolation of Lymphocytes and Granulocytes Using Prefocused Free Flow Acoustophoresis; Analytical Chemistry; vol. 87; pp. 5596-5604; 2015.
Higginson et al.; Tunable optics derived from nonlinear acoustic effects; Journal of Applied Physics; vol. 95; No. 10; pp. 5896-5904; 2004.
Hill et al.; Ultrasonic Particle Manipulation; Microfluidic Technologies for Miniaturized Analysis Systems, Jan. 2007, pp. 359-378.
Ilinskii et al.; Acoustic Radiation Force on a Sphere in Tissue; AIP Conference Proceedings; 2012.
Kuznetsova et al.; Microparticle concentration in short path length ultrasonic resonators: Roles of radiation pressure and acoustic streaming; Journal of the Acoustical Society of America, American Institute of Physics for the Acoustical Society of America, vol. 116, No. 4, Oct. 1, 2004, pp. 1956-1966, DOI: 1.1121/1.1785831.
Latt et al.; Ultrasound-membrane hybrid processes for enhancement of filtration properties; Ultrasonics sonochemistry 13.4 (2006): 321-328.
Li et al.; Electromechanical behavior of PZT-brass unimorphs; J. Am. Ceram. Soc. vol. 82; No. 7; pp. 1733-1740, 1999.
Lipkens et al.; The effect of frequency sweeping and fluid flow on particle trajectories in ultrasonic standing waves; IEEE Sensors Journal, vol. 8, No. 6, pp. 667-677, 2008.
Lipkens et al.; Frequency sweeping and fluid flow effects on particle trajectories in ultrasonic standing waves; Acoustics 08, Paris, Jun. 29-Jul. 4, 2008.
Lipkens et al.; Prediction and measurement of particle velocities in ultrasonic standing waves; J. Acoust. Soc. Am., 124 No. 4, pp. 2492 (A) 2008.

Lipkens et al.; Separation of micron-sized particles in macro-scale cavities by ultrasonic standing waves; Presented at the International Congress on Ultrasonics, Santiago; Jan. 11-17, 2009.
Lipkens et al.; Separation of bacterial spores from flowering water in macro-scale cavities by ultrasonic standing waves; submitted/uploaded to http://arxiv.org/abs/1006.5467 on Jun. 28, 2010.
Lipkens et al., Macro-scale acoustophoretic separation of lipid particles from red blood cells, The Journal of the Acoustical Society of America, vol. 133, Jun. 2, 2013, p. 045017, XP055162509, New York, NY.
Meribout et al.; An Industrial-Prototype Acoustic Array for Real-Time Emulsion Layer Detection in Oil Storage Tanks; IEEE Sensors Journal, vol. 9, No. 12, Dec. 2009.
Musiak et al.; Design of a Control System for Acoustophoretic Separation, 2013 IEEE 56th International Midwest Symposium on Circuits and Systems (MWSCAS), Aug. 2013, pp. 1120-1123.
Nilsson et al.; Review of cell and particle trapping in microfluidic systems; Department of Measurement Technology and Industrial Electrical Engineering, Div. of Nanobiotechnology, Lund University, P.O. Box 118. Lund, Sweden, Analytica Chimica Acta 649, Jul. 14, 2009, pp. 141-157.
Pangu et al.; Droplet transport and coalescence kinetics in emulsions subjected to acoustic fields; Ultrasonics 46, pp. 289-302 (2007).
Phys. Org. "Engineers develop revolutionary nanotech water desalination membrane." Nov. 6, 2006. http://phys.org/news82047372.html.
Ponomarenko et al.; Density of states and zero Landau level probed through capacitance of graphene; Nature Nanotechnology Letters, Jul. 5, 2009; DOI: 10.1038/NNANO.2009.177.
"Proceedings of the Acoustics 2012 Nantes Conference," Apr. 23-27, 2012, Nantes, France, pp. 278-282.
Ryll et al.; Performance of Small-Scale CHO Perfusion Cultures Using an Acoustic Cell Filtration Device for Cell Retention: Characterization of Separation Efficiency and Impact of Perfusion on Product Quality; Biotechnology and Bioengineering; vol. 69; Iss. 4; pp. 440-449; Aug. 2000.
Seymour et al, J. Chem. Edu., 1990, 67(9), p. 763, published Sep. 1990.
Volpin et al.; Mesh simplification with smooth surface reconstruction; Computer-Aided Design; vol. 30; No. 11; 1998.
Wang et al.; Retention and Viability Characteristics of Mammalian Cells in an Acoustically Driven Polymer Mesh; Biotechnol. Prog. 2004, pp. 384-387 (2004).
Wicklund et al.; Ultrasonic Manipulation of Single Cells; Methods in Molecular Biology; vol. 853; pp. 1777-196; 2012.
Annex to Form PCT/ISA/206—Communication Relating to the Results of the Partial International Search Report dated Jul. 18, 2013.
European Search Report of European Application No. 11769474.5 dated Sep. 5, 2013.
European Search Report of European Application No. 11796470.0 dated Jan. 5, 2016.
European Search Report of European Application No. 13760840.2, dated Feb. 4, 2016.
European Search Report of European Application No. 13721179.3 dated Mar. 23, 2016.
European Search Report for European Application No. 14749278.9 dated Jan. 13, 2017.
Extended European Search Report for European Application No. EP 12833859.7 dated Mar. 20, 2015.
Extended European Search Report for European Application No. EP 14787587.6 dated Jan. 2, 2017.
International Search Report and Written Opinion for International Application No. PCT/US2011/032181 dated Dec. 20, 2011.
International Search Report and Written Opinion for International Application No. PCT/US2011/040787 dated Feb. 27, 2012.
International Search Report and Written Opinion for International Application No. PCT/US2012/051804 dated Nov. 16, 2012.
International Search Report and Written Opinion for International Application No. PCT/US2013/037404 dated Jun. 21, 2013.
International Search Report and Written Opinion for International Application No. PCT/US2013/032705 dated Jul. 26, 2013.

(56) References Cited

OTHER PUBLICATIONS

International Search Report and Written Opinion for International Application No. PCT/US2013/050729 dated Sep. 25, 2013.
International Search Report and Written Opinion for International Application No. PCT/US2013/059640 dated Feb. 18, 2014.
International Search Report and Written Opinion for International Application No. PCT/US2014/015382 dated May 6, 2014.
International Search Report and Written Opinion for International Application No. PCT/US2014/035557 dated Aug. 27, 2014.
International Search Report and Written Opinion for International Application No. PCT/US2014/043930 dated Oct. 22, 2014.
International Search Report and Written Opinion for International Application No. PCT/US2014/046412 dated Oct. 27, 2014.
International Search Report and Written Opinion for International Application No. PCT/US2014/064088 dated Jan. 30, 2015.
International Search Report and Written Opinion for International Application No. PCT/US2015/010595 dated Apr. 15, 2015.
International Search Report and Written Opinion for International Application No. PCT/US2015/019755 dated May 4, 2015.
International Search Report and Written Opinion for International Application No. PCT/US2015/030009 dated Jul. 30, 2015.
International Search Report and Written Opinion for International Application No. PCT/US2015/039125 dated Sep. 30, 2015.
International Search Report and Written Opinion for International Application No. PCT/US2015/053200 dated Dec. 28, 2015.
International Search Report and Written Opinion for International Application No. PCT/US2015/066884, dated Mar. 22, 2016.
International Search Report and Written Opinion for International Application No. PCT/US2016/024082 dated Jun. 27, 2016.
International Search Report and Written Opinion for International Application No. PCT/US2016/031357 dated Jul. 26, 2016.
International Search Report and Written Opinion for International Application No. PCT/US2016/038233 dated Sep. 26, 2016.
International Search Report and Written Opinion for International Application No. PCT/US2015/024365 dated Oct. 13, 2016.
International Search Report and Written Opinion for International Application No. PCT/US2016/041664 dated Oct. 18, 2016.
International Search Report and Written Opinion for International Application No. PCT/US2016/044586 dated Oct. 21, 2016.
International Search Report and Written Opinion for International Application No. PCT/US2016/049088 dated Nov. 28, 2016.
International Search Report and Written Opinion for International Application No. PCT/US2016/050415 dated Nov. 28, 2016.
International Search Report and Written Opinion for International Application No. PCT/US2016/037104 dated Dec. 16, 2016.
International Search Report and Written Opinion for International Application No. PCT/US2017/015197 dated Apr. 3, 2017.
International Search Report and Written Opinion for International Application No. PCT/US2017/015450 dated Apr. 10, 2017.
International Search Report and Written Opinion for International Application No. PCT/US2016/047217 dated Apr. 11, 2017.
International Search Report and Written Opinion for International Application No. PCT/US2016/048243 dated Apr. 20, 2017.
International Search Report and Written Opinion for International Application No. PCT/US2017/017788 dated May 8, 2017.
Sony New Release: <http://www.sony.net/SonyInfo/News/Press/201010/10-137E/index.html>.

\* cited by examiner

ACOUSTOPHORETIC METHOD FOR USE IN BIOREACTORS

The present application is a continuation-in-part of U.S. patent application Ser. No. 13/866,943, filed Apr. 19, 2013, which claims the benefit of U.S. Provisional Patent Ser. No. 61/636,546, filed Apr. 20, 2012. These applications are incorporated herein by reference in their entireties.

BACKGROUND

The present disclosure relates to waste treatment systems and to devices that can be used to accelerate the separation of solid particles or fluids. Also disclosed are methods of separation.

Wastewater from sewage or industrial wastes can include suspended particles and other fluids besides water. Waste treatment systems are designed to separate these undesirable wastes from the water. One form of treatment equipment is a large tank or vessel which is designed to provide a long residence time.

Sedimentation is the process by which suspended particles heavier than water are removed by gravitational settling to the bottom of such a tank. In addition, lighter-than-water fluids, such as fats or oils, will rise to the top of such a tank. A "settling tank" is the term generally used to describe a tank whose purpose is to remove the sediment that collects at the bottom of a tank. "Sludge" is the term generally used to describe the sedimented material itself. A "skim tank" is the term generally used to describe a tank that is used to capture such fluids that rise to the top of the tank.

FIG. 1 is a side cross-sectional view of one kind of conventional settling tank. The settling tank has an inlet in the center of the tank. Wastewater is distributed as uniformly as possible from the inlet. In the settling zone, water has a very low velocity, allowing suspended solids to sink due to gravity. This creates a sludge zone on the bottom of the tank. The resulting clarified water is captured in a decanting trough and exits the settling tank. A scraper arm on the bottom of the tank pushes the sludge into a sludge collecting trough, and the sludge is thus removed from the settling tank.

FIG. 2 is a side-cross-sectional view of one kind of conventional skim tank. Wastewater is distributed through an inlet in the center of the tank. Lighter-than-water fluid, such as oil will rise, while the water sinks. An oil outlet located at the top of the tank permits removal of the lighter-than-water fluids. A water outlet is located at the bottom of the tank. A skimming arm may be located at the top of the tank to push the lighter-than-water fluid into a collection area.

Stokes' law describes the settling velocity of a suspended particle. The settling velocity is affected by the mass density of the particle, the mass density of the fluid, the dynamic viscosity of the fluid, and the radius of the particle. Some types of particles are difficult to separate from water. This includes small particles, having a radius of less than 6 µm and particles whose density is very close to that of water.

Brownian motion will cause suspended solids to stay in suspension. A method to agglomerate, coalesce, aggregate, clump and otherwise increase in size and number of particles such that the suspended particles will settle or buoy out of the suspension.

It would be desirable to provide systems, devices, and methods that could accelerate the separation of undesirable waste products from water.

BRIEF DESCRIPTION

The present disclosure relates to systems and devices for performing acoustophoresis in a tank, vessel, or bioreactor. The devices use an ultrasonic transducer as described herein. The transducer is driven at frequencies that produce multiple standing waves. These standing waves act to separate particles from fluids, or to separate two fluids of different densities, from each other. This can speed up the separation time and enhance the operation of a tank (e.g., a settling tank or a skim tank), a vessel, or a bioreactor. The vessel may be open or closed. The ultrasonic transducer(s) of the present disclosure can be used in acoustophoretic systems to separate particles or secondary fluid from a primary fluid. Such systems may be used with bioreactors, such as in a fed batch or perfusion process, to produce biomolecules, such as recombinant proteins or monoclonal antibodies, or cells, and to separate these desirable products from a cell culture in the bioreactor.

Disclosed in various embodiments is a method of accelerating separation in a tank, the method comprising: placing a submersible acoustophoretic separator in the tank, the acoustophoretic separator having a transducer, a reflector on a side opposite the transducer, and at least one exposed face; flowing a fluid into the tank, the fluid having a first density and containing particles or droplets having a different density; applying acoustic energy to the fluid with the transducer to create a plurality of incident waves; and reflecting the plurality of incident waves from the reflector, creating a plurality of reflected waves resonating with the incident waves, thus forming a plurality of standing waves in the fluid between the transducer and the reflector, wherein the fluid is separated from the particles or droplets by the standing waves. In particular embodiments, the tank can be a bioreactor.

Generally, the standing waves create nodal lines and lateral forces that trap the particles or droplets in the nodal lines. The particles or droplets trapped in the nodal lines coalesce or agglomerate such that the particles or droplets are separated from the fluid.

In some embodiments, the at least one exposed face of the submersible acoustophoretic separator is a top face, allowing the trapped particles or droplets to float up out of the separator as they coalesce or agglomerate.

In other embodiments, the fluid is circulated in the tank to move fluid through the separator.

Also disclosed in different embodiments is an apparatus comprising: a tank containing a fluid containing particles or droplets; and an acoustophoretic separator in the tank, the acoustophoretic separator comprising a transducer and a reflector opposite the transducer, wherein the fluid can flow between the transducer and the reflector.

The transducer can include a ceramic crystal made of PZT-8.

Ceramic crystal can mean a polycrystal.

The acoustophoretic separator may include a housing that mechanically connects the transducer and the reflector. The housing can be adjustable to vary the distance between the transducer and the reflector.

In particular embodiments, the housing has a transducer face that contains the transducer, a reflector face that contains the reflector, a lower support plate connecting a lower edge of the transducer face to a lower edge of the reflector face, and support rods connecting an upper edge of the transducer face to an upper edge of the reflector face.

The housing can include wheels or treads for propelling the separator on the bottom of the tank. The housing can alternatively include a flotation device.

The acoustic separator with a flotation device may incorporate a mechanism for propulsion such that the floating acoustic separator may wander through out the volume of the tank or bioreactor.

The separator can be suspended from a boom.

Sometimes, the reflector is formed from a wall of the tank, and the transducer is mounted on a track and is pointed towards the wall of the tank.

Also disclosed in different embodiments herein is a submersible acoustophoretic separator, comprising: a housing having a transducer face, a reflector face opposite the transducer face, a support joining the transducer face and the reflector face, and at least one exposed face; a transducer on the transducer face; and a reflector on the reflector face.

The housing can be adjustable to vary the distance between the transducer face and the reflector face.

The support can be a set of support rods connecting a top edge of the transducer face to a top edge of the reflector face. The support may alternatively be a lower support plate connecting a bottom edge of the transducer face to a lower edge of the reflector face.

The housing can include wheels or treads for propelling the separator on the bottom of the tank. The separator could further comprise a flotation device.

In yet other embodiments, an apparatus includes a tank and a submersible acoustophoretic separator. The tank contains a host fluid containing particles or droplets. The submersible acoustophoretic separator, in the tank, has a plurality of ultrasonic transducers, the transducers each including a ceramic crystal driven by an oscillating, periodic, or pulsed voltage signal of ultrasonic frequencies which drives the transducers to vibrate in a non-uniform mode of displacement to create standing waves in the flow channel. The separator also includes a reflector located on the wall on the opposite side of the flow chamber from the transducers.

In further embodiments, a method of accelerating separation in a bioreactor comprises: placing a submersible acoustophoretic separator in the bioreactor, the submersible acoustophoretic separator having a transducer and a reflector; providing a host fluid in the bioreactor, the host fluid having a first density and containing particles or droplets having a different density; and applying acoustic energy with the transducer to create a multimode or multidimensional acoustic standing wave between the transducer and the reflector, wherein the host fluid is separated from the particles or droplets by the multimode or multidimensional acoustic standing wave. In particular embodiments, the multimode or multidimensional acoustic standing wave results in an acoustic radiation force having an axial force component and a lateral force component that are of the same order of magnitude.

In particular embodiments, the acoustophoretic separator has (i) a housing having (a) the transducer on a transducer face, (b) the reflector on a reflector face opposite the transducer face, (c) a support joining the transducer face and the reflector face, and (d) at least one exposed face that allows fluid to enter a separation area located between the transducer face and the reflector face. The support can be a set of support rods connecting a lower edge of the transducer face to a lower edge of the reflector face.

Other example methods for separation in a bioreactor are disclosed. A first example method comprises placing a submersible acoustophoretic separator in the bioreactor, the acoustophoretic separator having (i) a housing having (a) at least one transducer and (b) at least one reflector; wherein the bioreactor contains a host fluid and at least one secondary phase; wherein the transducer is composed of a piezoelectric material and the reflector is made of a high acoustic impedance material; applying acoustic energy to the fluid with the transducer to create a multimode acoustic wave; reflecting the multimode acoustic wave from the reflector, thereby creating a multimode acoustic standing wave, wherein the multimode acoustic standing wave is exposed to the host fluid and the at least one secondary phase in the bioreactor; and separating the at least one secondary phase from the host fluid in an accelerated manner due to exposure to the multimode acoustic standing wave. In particular embodiments, the multimode acoustic standing wave results in an acoustic radiation force having an axial force component and a lateral force component that are of the same order of magnitude.

A second example method for separation in a bioreactor comprises: placing an acoustophoretic separator in the bioreactor, the acoustophoretic separator having (i) a housing having (a) at least one transducer and (b) at least one reflector; wherein the bioreactor contains (i) a host fluid and (ii) (a) dispersed particles or (b) a secondary fluid; wherein the transducer is composed of a piezoelectric material and the reflector is made of a high acoustic impedance material; applying acoustic energy to the host fluid with the transducer to create a multimode acoustic wave; reflecting the multimode acoustic wave from the reflector, thereby creating a multimode acoustic standing wave, wherein the multimode acoustic standing wave is exposed to the host fluid and the dispersed particles or secondary fluid in the bioreactor; coalescing, agglomerating, or precipitating the dispersed particles or secondary fluid into larger particles or droplets so that the larger particles or droplets settle or float out of the host fluid in an accelerated manner due to exposure to the multimode acoustic standing wave. In particular embodiments, the multimode acoustic standing wave results in an acoustic radiation force having an axial force component and a lateral force component that are of the same order of magnitude.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
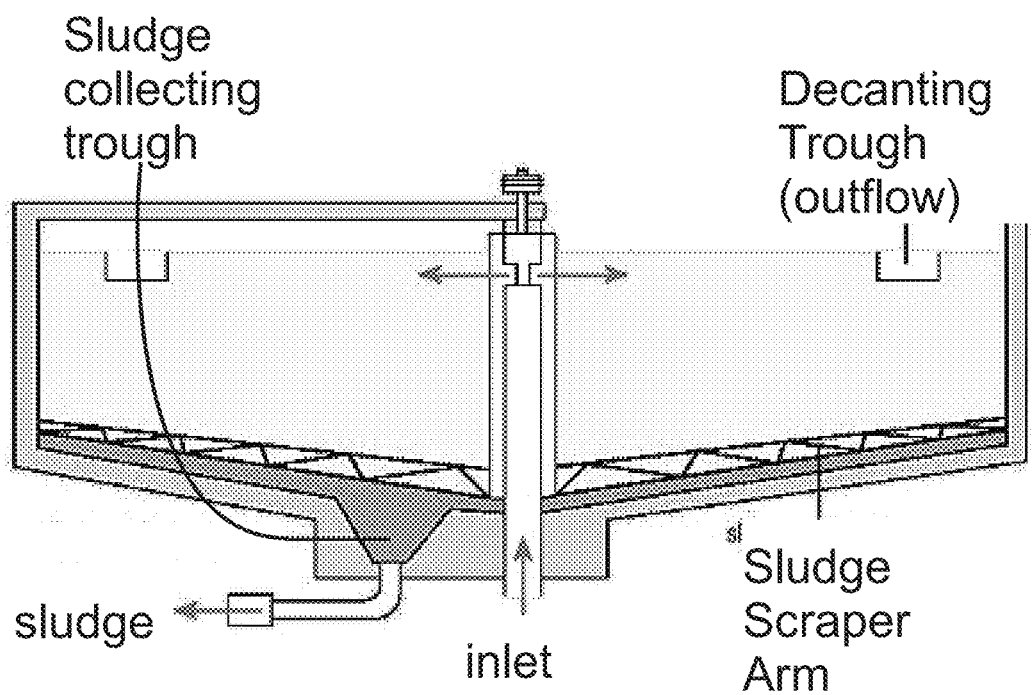
FIG. 1 is a side cross-sectional view of a conventional settling tank.

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4."

Some of the terms used herein are relative terms. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow fluids through an upstream component prior to flowing through the downstream component. The terms "upper" and "lower" are relative to a central point. An upper component is located in one direction from the central point and a lower component would be located in the opposite direction from the central point.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" and "downwards" are also relative to an absolute reference; upwards is always against the gravity of the earth.

The present disclosure refers to suspended solids, particles, and droplets. "Solids" and "particles" should be considered to refer to materials that are denser than water, while "droplets" refers to materials that are less dense than water. However, these three terms also share a common characteristic of being suspended or dispersed in a fluid, and are desirably separated from the fluid. Cells, cellular debris, viruses and biomolecules are non-limiting examples of "particles." Depending on the context, reference to any one of these terms should be construed as referring to any of these three terms due to this common characteristic, and thus should not be construed as somehow being limited to only the one used term based on density.

The term "agitator" is used herein to refer to any device or system which can be used to cause mixing of a fluid volume, such that material in the fluid volume is dispersed and becomes more homogeneous. The agitator could be, for example, a set of rotating blades, though it is to be understood that any type of system that causes circulation is contemplated, such as non-physical impeller agitators (e.g., aerators which use air).

As previously mentioned, conventional settling tanks or skimming tanks require a long residence time to allow solids or droplets to either settle to the bottom or float to the top of the tank. It would be desirable to provide systems and devices that can be used to increase the rate of separation of the solids/droplets from the water in the tank.

Acoustophoresis

Acoustophoresis is the separation of particles using high intensity sound waves. It has long been known that high intensity standing waves of sound can exert forces on particles. A standing wave has a pressure profile which appears to "stand" still in time. The pressure profile in a standing wave varies from areas of high pressure (nodes) to areas of low pressure (anti-nodes). Standing waves are produced in acoustic resonators. Common examples of acoustic resonators include many musical wind instruments such as organ pipes, flutes, clarinets, and horns.

Acoustophoresis is a low-power, no-pressure-drop, no-clog, solid-state approach to particle removal from fluid dispersions: i.e., it is used in continuous flow applications to achieve separations that are more typically performed with porous filters, but it has none of the disadvantages of filters.

Acoustophoretic phase separator technology using ultrasonic standing waves provides the benefit of having no consumables, no generated waste, and a low cost of energy.

The technology is efficient at removal of particles of greatly varying sizes, including separation of micron and sub-micron sized particles, as explained in commonly owned U.S. patent application Ser. No. 13/844,754, which is hereby incorporated by reference in its entirety. Examples of acoustic filters/collectors utilizing acoustophoresis can be found in commonly owned U.S. patent application Ser. Nos. 12/947,757; 13/085,299; 13/216,049; and 13/216,035, the entire contents of each being hereby fully incorporated by reference.

Acoustophoresis may be used in a continuous flow process or, as described below, can be used to accelerate the separation of particles from water in a tank (either a settling tank or a skim tank, as the case may be), a vessel, or a bioreactor.

The acoustic resonator is designed to create a high intensity three dimensional ultrasonic standing wave that results in an acoustic radiation force that is larger than the combined effects of fluid drag and buoyancy, and is therefore able to trap, i.e., hold stationary, the suspended phase. In continuous flow systems, the systems have the ability to create ultrasonic standing wave fields that can trap particles in flow fields with linear velocity exceeding 1 cm/s. Excellent particle separation efficiencies have been demonstrated for particle sizes as small as one micron. The pressure amplitudes for this acoustophoresis process can, in some implementations, can cause acoustic streaming at the edges of the separator, which results in circulatory motion that can cause stirring or mixing in the fluid.

The acoustophoretic separation technology employs ultrasonic standing waves to trap, i.e., hold stationary, secondary phase particles in a host fluid. This is an important distinction from previous approaches where particle trajectories were merely altered by the effect of the acoustic radiation force. The scattering of the acoustic field off the particles results in a three dimensional acoustic radiation force, which acts as a three-dimensional trapping field. The acoustic radiation force is proportional to the particle volume (e.g. the cube of the radius). It is proportional to frequency and the acoustic contrast factor. It also scales with acoustic energy (e.g. the square of the acoustic pressure amplitude). The sinusoidal spatial variation of the force is what drives the particles to the stable positions of the standing waves. When the acoustic radiation force exerted on the particles is stronger than the combined effect of fluid drag force and buoyancy/gravitational force, the particle is trapped within the acoustic standing wave field. The action of the acoustic forces on the trapped particles results in concentration, agglomeration and/or coalescence of particles and droplets. Heavier-than-water (i.e. denser than water, such as red blood cells) particles are separated through enhanced gravitational settling, and lighter-than-water particles (e.g. lipids) are separated through enhanced buoyancy.

Acoustophoretic Phase Separator

Experiments have been carried out with acoustophoretic particle separators in which fluid passed through a flow chamber, and separation of oil/particles from the fluid was achieved.

Figure 3:
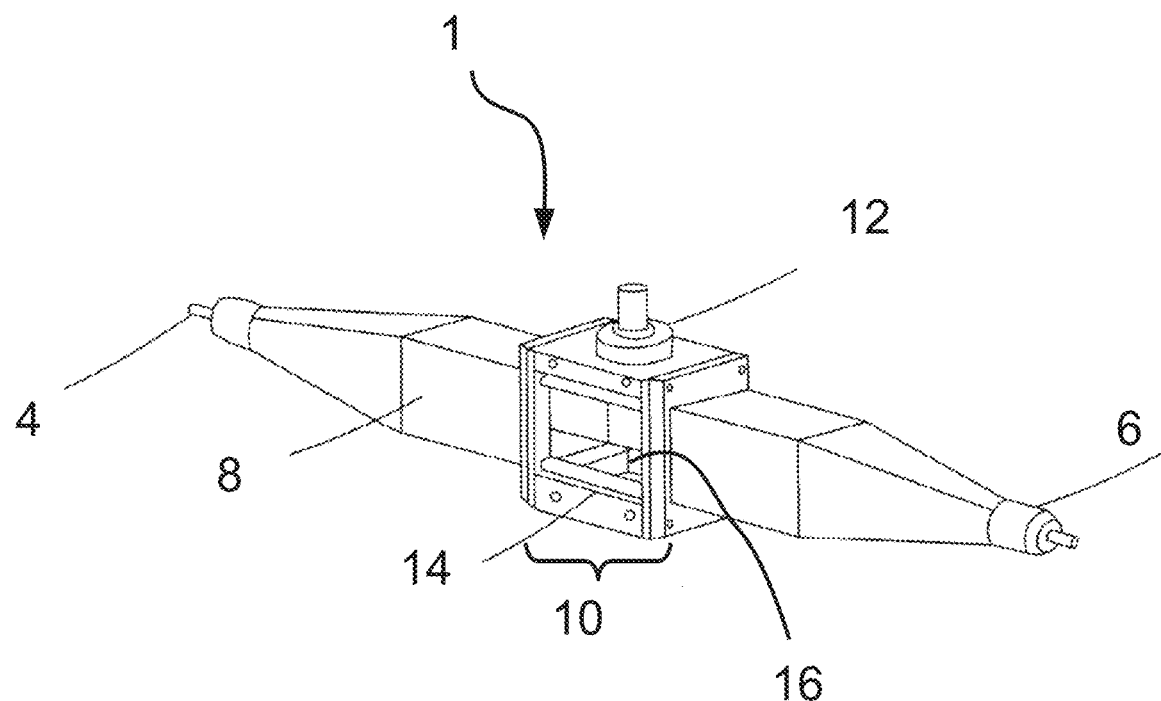
FIG. 3 shows an acoustophoretic separator having a flow chamber with one transducer.

A schematic representation of one such embodiment of an acoustophoretic particle separator 1 for use with a continuous flow system is shown in FIG. 3. This separator is shown primarily to explain the operation of the separator. A multi-component liquid stream (e.g. water or other fluid) enters the inlet 4 and separated fluid exits at the opposite end via outlet 6. It should be noted that this liquid stream is usually under pressure when flowing through the separator. The particle separator 1 has a longitudinal flow channel 8 that carries the multi-component liquid stream and passes through a resonator 10. The resonator 10 includes a transducer 12 or, in some embodiments, an array of transducers, which acts as an excitation source of acoustic waves. The acoustic resonator 10 has a reflector 14, which is located on the wall opposite the transducer 12. A collection pocket 16 collects impurities, and is also located opposite the transducer. As defined herein, impurities includes particles or fluids distinct from the host fluid. The acoustic resonator 10 is designed to maintain a high intensity three-dimensional acoustic standing wave. The system is driven by a function generator and amplifier (not shown). The system performance is monitored and controlled by a computer.

Very generally, ultrasonic transducers including a piezoelectric material are utilized to generate acoustic standing waves in fluid through the input of an electronic signal (e.g., based on voltage, current, magnetism, electromagnetism, capacitive or any other type of signal to which the transducer is responsive) at a certain frequency or frequencies, with or without amplification of the electronic signal, such that the piezoelectric material will expand and contract in the direction that the piezoelectric material is polled. It is desirable to obtain as high an efficiency factor (known as the Q-factor) as possible for the conversion of the electrical impulse to the mechanical movement in the piezoelectric material. Minimizing the dampening of the piezoelectric material aids in obtaining a high Q-factor. The transducer can be driven by a drive signal, such as an electrical signal (AC, DC or combinations thereof), which can be a voltage signal or a current signal, a magnetic signal, an electromagnetic signal, a capacitive signal, or any other type of signal to which the transducer is responsive to create a multi-dimensional acoustic standing wave. In embodiments, the voltage signal driving the transducer can have a pulsed, sinusoidal, square, sawtooth, or triangle waveform or combinations thereof; and have a frequency of 500 kHz to 10 MHz. The voltage signal can be driven with pulse width modulation, which can be used to produce any desired waveform. The voltage signal can be amplitude or frequency modulated. The drive signal may be turned on or off and/or configured with start/stop capability to, for example, control or eliminate streaming.

Figure 4:
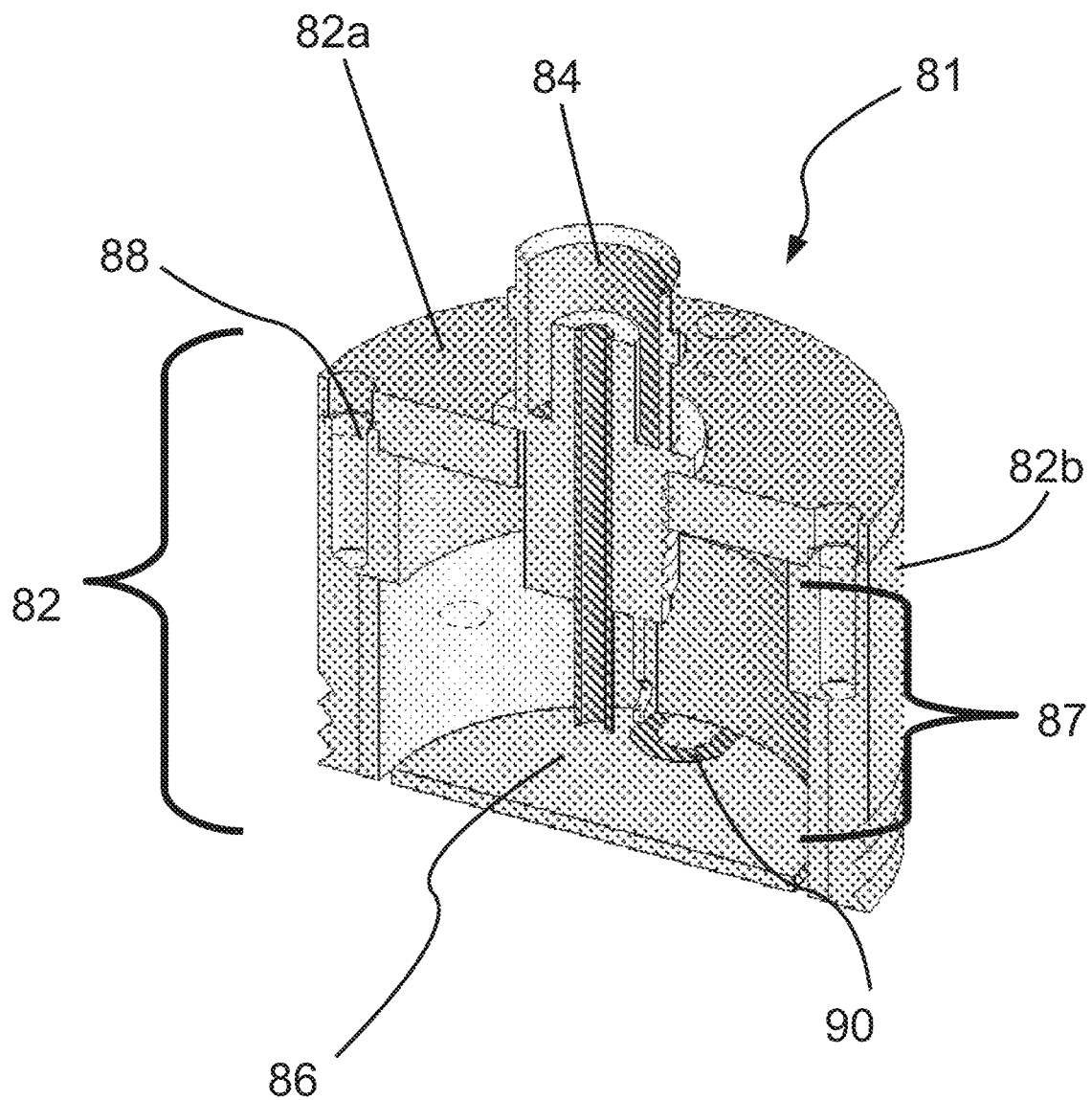
FIG. 4 is a cross-sectional diagram of an ultrasonic transducer of the present disclosure. An air gap is present within the transducer, and no backing layer is present.

FIG. 4 is a cross-sectional view of an ultrasonic transducer 81 of the present disclosure, which can be used with the acoustophoretic separators of the present disclosure. Transducer 81 has an aluminum housing 82. A PZT crystal 86 defines the bottom end of the transducer, and is exposed from the exterior of the housing. The crystal is supported on its perimeter by the housing. Excitation frequencies typically in the range from hundreds of kHz to several MHz are applied by transducer 22.

Figure 2:
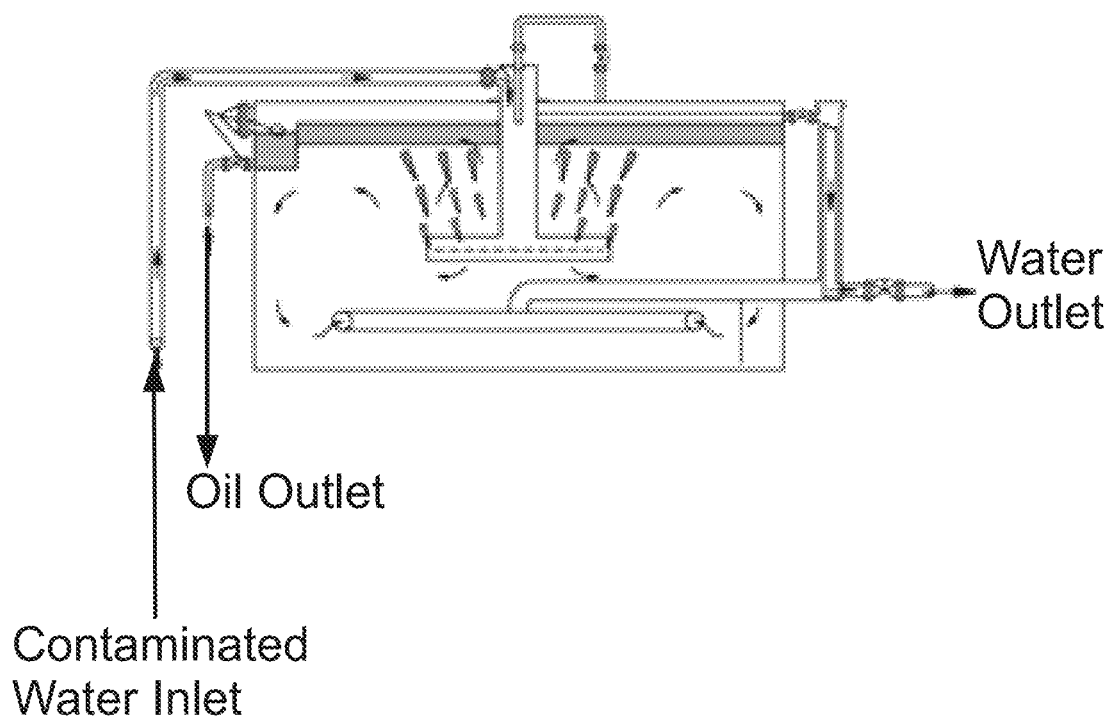
FIG. 2 is a side cross-sectional view of a conventional skim tank.

Screws (not shown) attach an aluminum top plate 82a of the housing to the body 82b of the housing via threads 88. The top plate includes a connector 84 to pass power to the PZT crystal 86. Electrical power is provided to the PZT crystal 86 by electrical lead 90. Note that the crystal 86 has no backing layer. Put another way, there is an air gap 87 in the transducer between aluminum top plate 82a and the crystal 86. A minimal backing may be provided in some embodiments. The transducer is enclosed in a watertight housing 30 (see FIG. 2).

The transducer design affects performance of the system. A typical transducer is a layered structure with the ceramic crystal bonded to a backing layer and a wear plate. Because the transducer is loaded with the high mechanical impedance presented by the standing wave, the traditional design guidelines for wear plates, e.g., half or quarter wavelength thickness, and manufacturing methods may not be appropriate.

Rather, in one embodiment of the present disclosure the transducers have no wear plate or backing, allowing the crystal to vibrate with a high Q-factor. In this regard, the Q-factor describes the sound emanating from the transducer according to the equation $Q=f_o$/bandwidth, where $f_o$ is the center frequency and the bandwidth is the width of the frequency distribution. A "high-Q" transducer has a relatively small bandwidth and long spatial pulse length. A "low-Q" transducer has a relatively large bandwidth and short spatial pulse length.

The vibrating ceramic crystal/disk is directly exposed to the fluid flowing through the flow chamber. In embodiments, there is a silver electrode on either side of the vibrating crystal. Typically, there is a thin metal layer on both sides of the PZT crystal (that serves as an electrode) so as to excite the transducer.

Removing the backing (e.g. making the crystal air backed) also permits the ceramic crystal to obtain higher order modes of vibration (e.g. higher order modal displacement). In a transducer having a crystal with a backing, the crystal vibrates with a uniform displacement, like a piston. Removing the backing allows the crystal to vibrate in a non-uniform displacement mode. The higher order the mode shape of the crystal, the more nodal lines the crystal has. The higher order modal displacement of the crystal creates more trapping lines, although the correlation of trapping line to node is not necessarily one to one, and driving the crystal at a higher frequency will not necessarily produce more trapping lines.

In some embodiments, the crystal may have a backing that minimally affects the Q-factor of the crystal (e.g. less than 5%). The backing may be made of a substantially acoustically transparent material such as balsa wood or cork which allows the crystal to vibrate in a higher order mode shape and maintains a high Q-factor while still providing some mechanical support for the crystal. In another embodiment, the backing may be a lattice work that follows the nodes of the vibrating crystal in a particular higher order vibration mode, providing support at node locations while allowing the rest of the crystal to vibrate freely. The goal of the lattice work or acoustically transparent material is to provide support without lowering the Q-factor of the crystal.

Placing the crystal in direct contact with the fluid or providing as thin of a wear plate as possible also contributes to the high Q-factor by avoiding the dampening and energy absorption effects of the wear plate. Possible wear layers are chrome, electrolytic nickel, or electroless nickel. Chemical vapor deposition could also be used to apply a layer of poly(p-xylxyene) (e.g. Parylene) or other polymer. Organic and biocompatible coatings such as silicone or polyurethane are also contemplated as a wear surface.

In the systems of the present disclosure, the system is operated at a voltage such that the particles are trapped in the ultrasonic standing wave, i.e., remain in a stationary position. The particles are collected in well defined trapping lines, separated by half a wavelength. Within each nodal plane, the particles are trapped in the minima of the acoustic radiation potential. The axial component of the acoustic radiation force drives the particles, with a positive contrast factor, to the pressure nodal planes, whereas particles with a negative contrast factor are driven to the pressure anti-nodal planes. The radial or lateral component of the acoustic radiation force is the force that traps the particle. In systems using typical transducers, the radial or lateral component of the acoustic radiation force is typically several orders of magnitude smaller than the axial component of the acoustic radiation force. On the contrary, the lateral force in separators can be significant, on the same order of magnitude as the axial force component, and is sufficient to overcome the fluid drag force at linear velocities of up to 1 cm/s. As discussed above, the lateral force can be increased by driving the transducer in higher order mode shapes, as opposed to a form of vibration where the crystal effectively moves as a piston having a uniform displacement. These higher order modes of vibration are similar to the vibration of a membrane in drum modes such as modes (1,1), (1,2), (2,1), (2,2), (2, 3), or (m, n), where m and n are 1 or greater. The acoustic pressure is proportional to the driving voltage of the transducer. The electrical power is proportional to the square of the voltage.

Figure 5:
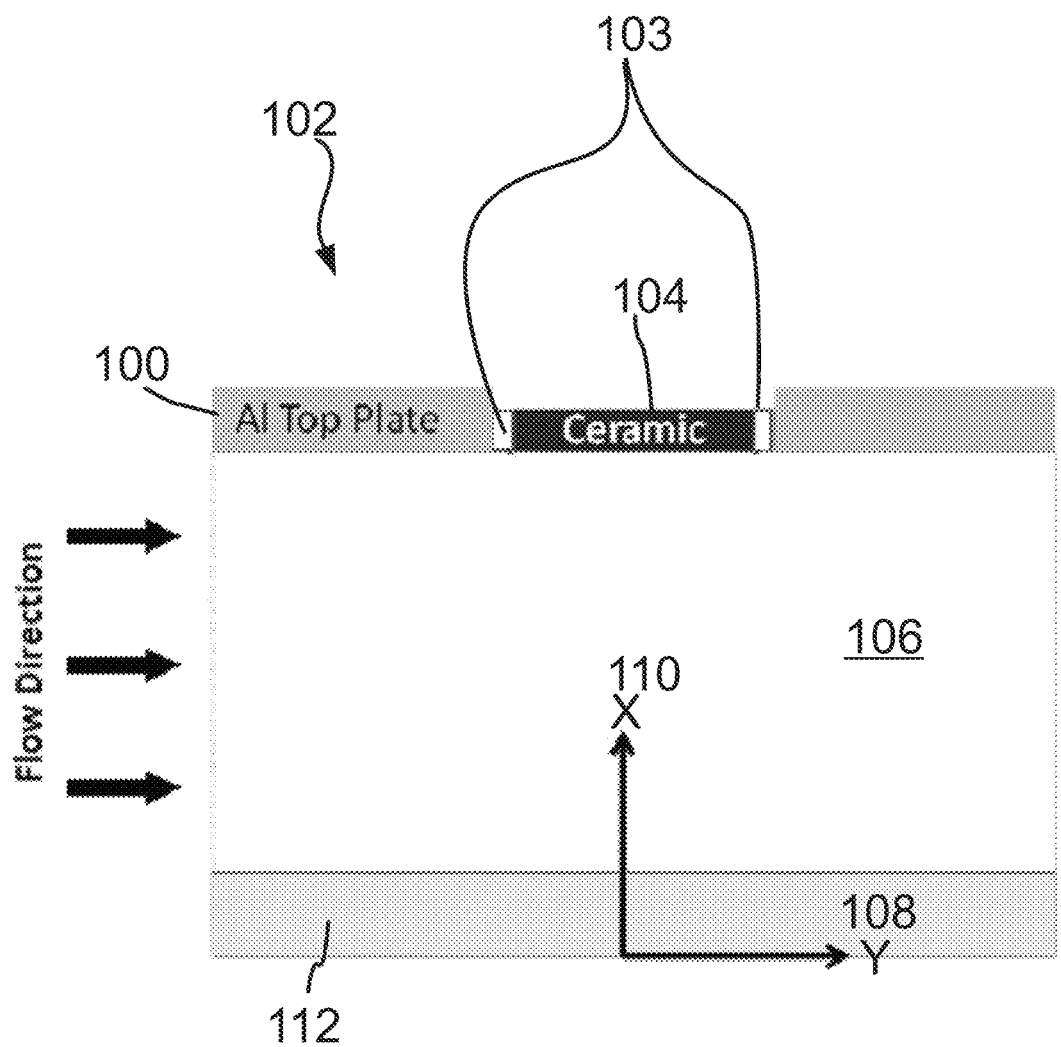
FIG. 5 is a computer model of an acoustophoretic separator simulated to generate FIGS. 6A-6D.

FIG. 5 is a computer model of an acoustophoretic separator 102 simulated to produce FIGS. 6A-6D. The piezo ceramic crystal 104 is in direct contact with the fluid in the water channel 106. In an embodiment for separation of lipids from blood, it is anticipated that a thin wear plate would be used. A layer of silicon 103 is between the crystal 104 and the aluminum top plate 100. A reflector 112 reflects the waves to create standing waves. The reflector is made of a high acoustic impedance material such as steel or tungsten, providing good reflection. For reference, the Y-axis 110 will be referred to as the axial direction. The X-axis 108 will be referred to as the radial or lateral direction. The acoustic pressure and velocity models were calculated in COMSOL including piezo-electric models of the PZT transducer, linear elastic models of the surrounding structure (e.g. reflector plate and walls), and a linear acoustic model of the waves in the water column. The acoustic pressure and velocity was exported as data to MATLAB. The radiation force acting on a suspended particle was calculated in MATLAB using Gor'kov's formulation. The particle and fluid material properties, such as density, speed of sound, and particle size, are entered into the program, and used to determine the monopole and dipole scattering contributions. The acoustic radiation force is determined by performing a gradient operation on the field potential U, which is a function of the volume of the particle and the time averaged potential and kinetic energy of the acoustic field.

Figure 6A:
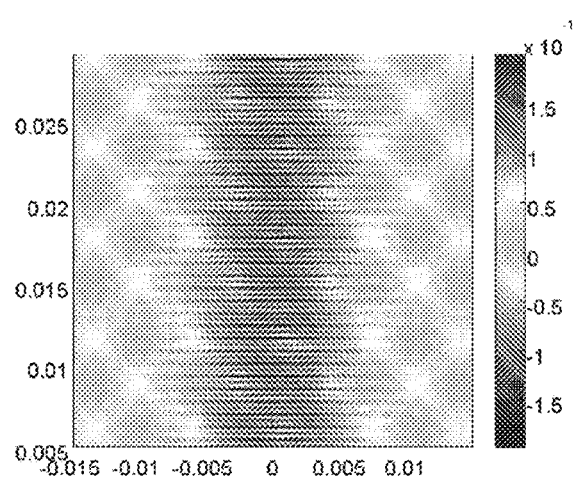
FIGS. 6A-6D is a simulation of the forces on a particle in an acoustophoretic separator.
Figure 6B:
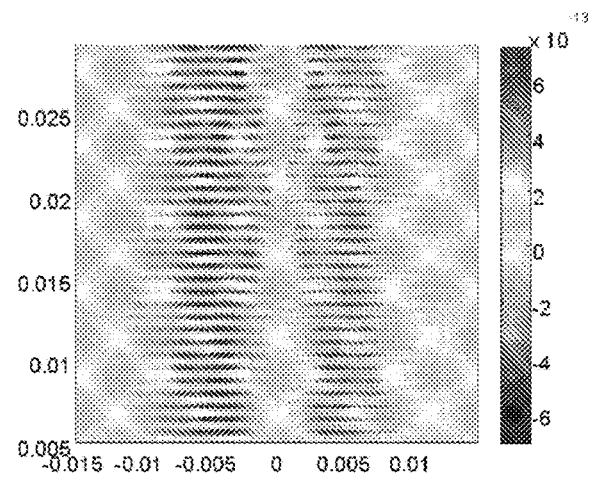
Figure 6C:
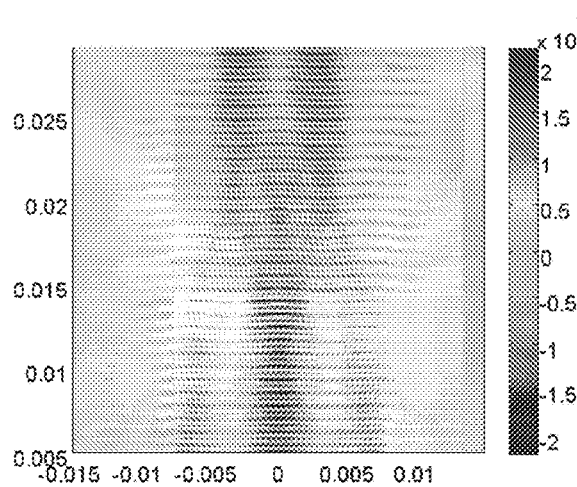
Figure 6D:
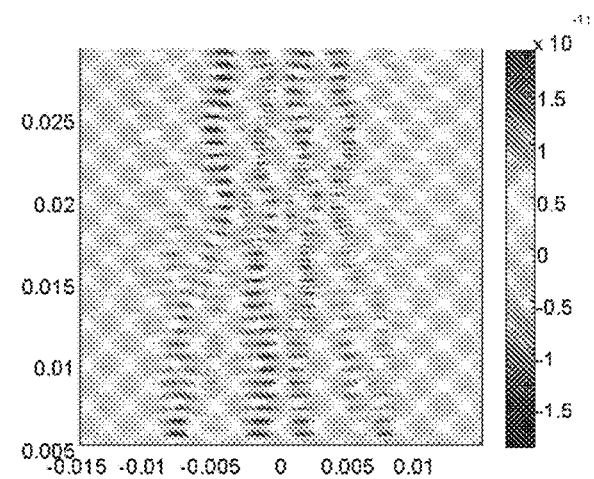

FIGS. 6A-6D show simulations of the difference in trapping between a single acoustic wave and a multimode acoustic wave. FIG. 6A shows the axial force associated with a single standing acoustic wave. FIG. 6B shows the lateral force due to a single standing acoustic wave. FIGS. 6C and 6D show the axial force and lateral force, respectively, in a multi-mode (higher order vibration modes having multiple nodes) piezoelectric crystal excitation where multiple standing waves are formed. The electrical input is the same as the single mode of FIGS. 6A and 6B, but the trapping force (lateral force) is 70 times greater (note the scale to the right in FIG. 6B compared to FIG. 6D). The figures were generated by a computer modeling simulation of a 1 MHz piezo-electric transducer driven by 10 V AC potted in an aluminum top plate in an open water channel terminated by a steel reflector (see FIG. 5). The field in FIGS. 6A and 6B is 960 kHz with a peak pressure of 400 kPa. The field in FIGS. 6C and 6D is 961 kHz with a peak pressure of 1400 kPa. In addition to higher forces, the 961 kHz field (FIGS. 6C and 6D) has more gradients and focal spots.

Figure 7:
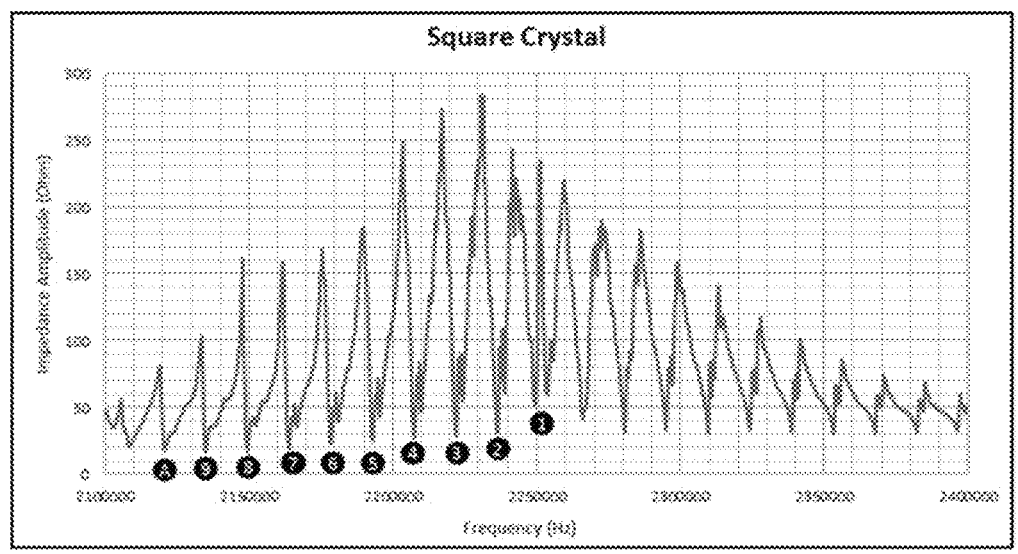
FIG. 7 is a graph of impedance amplitude versus frequency as a square transducer is driven at different frequencies.

In addition to the shape of the transducer, the shape of the mode of the transducer (in what shape the transducer is vibrating) affects oil separation efficiency. Producing more nodes provides more places for oil to be trapped. FIG. 7 shows the measured electrical impedance amplitude of the transducer as a function of frequency in the vicinity of the 2.2 MHz transducer resonance. The minima in the transducer impedance correspond to acoustic resonances of the water column and represent potential frequencies for operation. Numerical modeling has indicated that the transducer displacement profile varies significantly at these acoustic resonance frequencies, and thereby directly affects the acoustic standing wave and resulting trapping force. The transducer displacement mode shape varies from a single half wavelength mode to a three half wavelength mode shape. Higher order transducer modal displacement patterns result in higher trapping forces and multiple stable trapping locations for the captured oil droplets. A single half wavelength mode results in one line of trapped droplets, whereas a three half wavelength mode results in three parallel lines of trapped droplets across the fluid channel.

To investigate the effect of transducer mode shape on acoustic trapping force and oil separation efficiencies, an experiment was repeated ten times, with all conditions identical except for the excitation frequency. Ten consecutive acoustic resonance frequencies, indicated by circled numbers 1-9 and letter A on FIG. 7, were used as excitation frequencies. The conditions were experiment duration of 30 min, a 1000 ppm oil concentration, a flow rate of 500 ml/min, and an applied power of 20 W.

Figure 8:
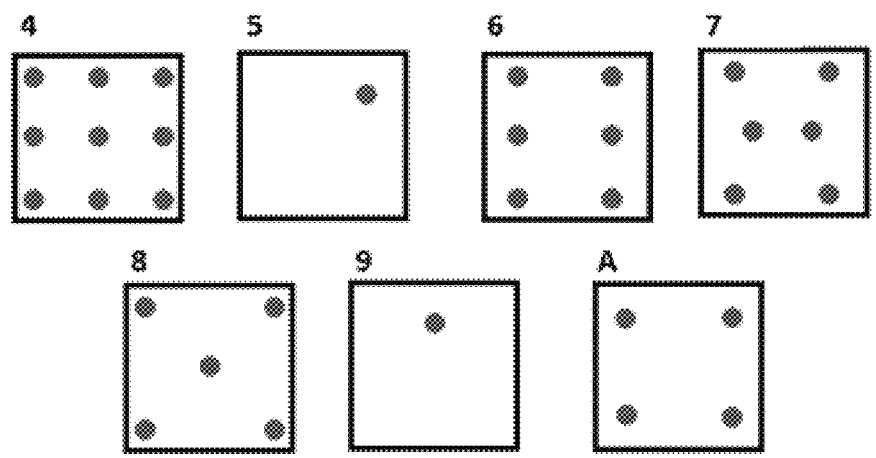
FIG. 8 illustrates the node configurations for seven of the peak amplitudes of FIG. 6.

As the emulsion passed by the transducer, the trapping nodal lines were observed and characterized. The characterization involved the observation and pattern of the number of nodal trapping lines across the fluid channel, as shown in FIG. 8, for seven of the ten resonance frequencies identified in FIG. 7.

The effect of excitation frequency clearly determines the number of nodal trapping lines, which vary from a single trapping line at the excitation frequency of acoustic resonance 5 and 9, to nine trapping nodal lines for acoustic resonance frequency 4. At other excitation frequencies four or five nodal trapping lines are observed. Different modes of vibration of the transducer can produce different (more) nodes of the standing waves, with more nodes generally creating higher trapping forces.

Figure 9:
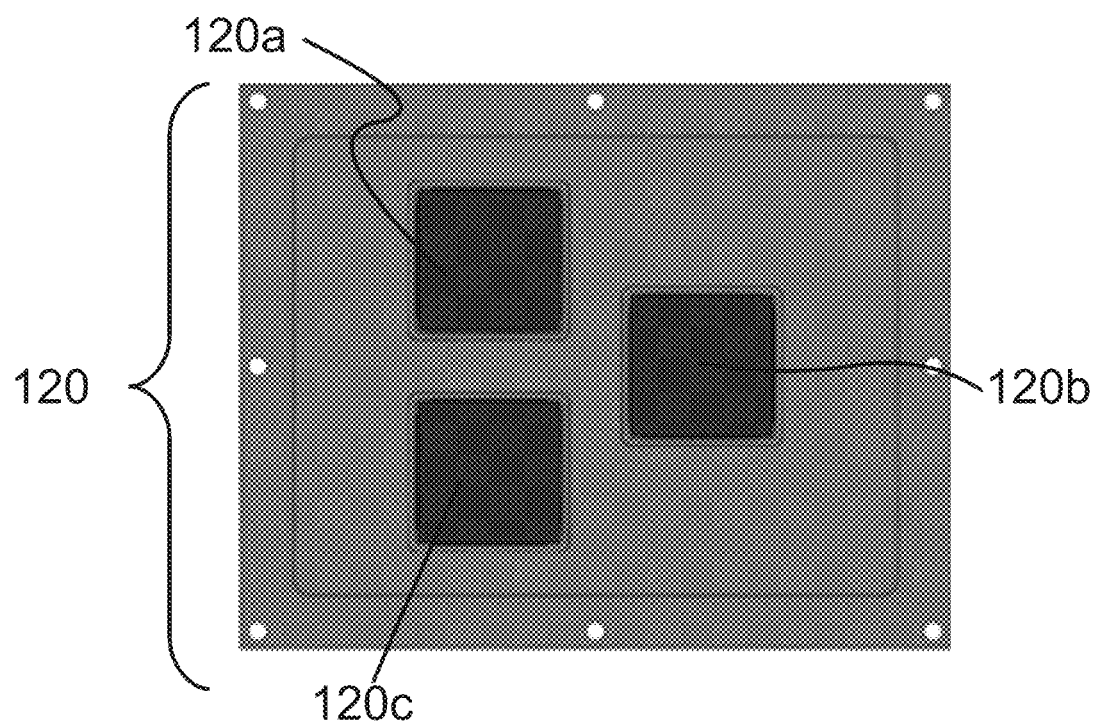
FIGS. 9 and 10 show transducer array configurations.
Figure 10:
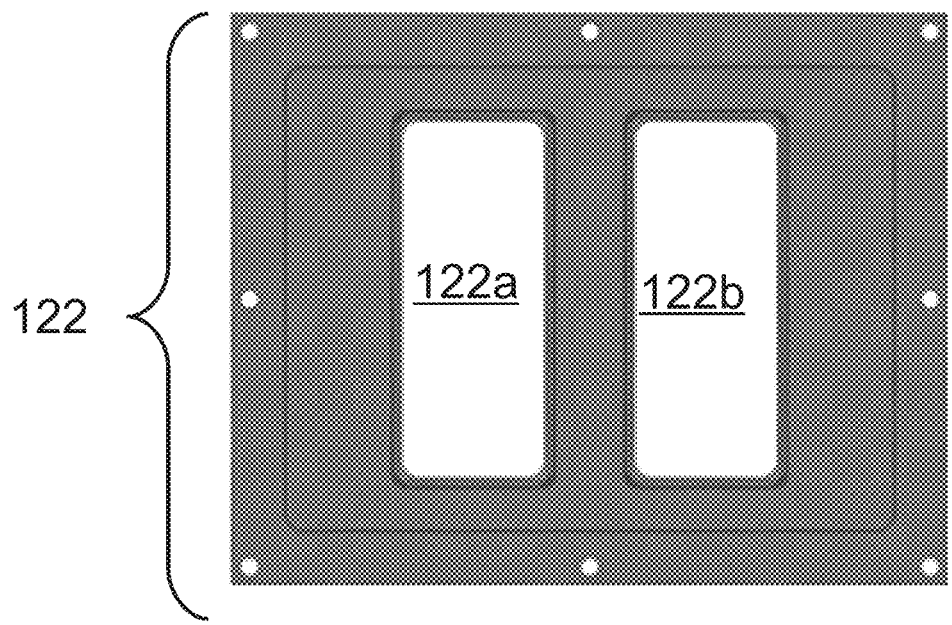

Different transducer arrangements are feasible. FIG. 9 shows a transducer array 120 including three square 1"×1" crystals 120a, 120b, 120c. Two squares are parallel to each other, and the third square is offset to form a triangular pattern. FIG. 10 shows a transducer array 122 including two rectangular 1"×2.5" crystals 122a, 122b arranged with their long axes parallel to each other. Power dissipation per transducer was 10 W per 1"×1" transducer cross-sectional area and per inch of acoustic standing wave span in order to get sufficient acoustic trapping forces. For a 4" span of an intermediate scale system, each 1"×1" square transducer consumes 40 W. The larger 1"×2.5" rectangular transducer uses 100 W in an intermediate scale system. The array of three 1"×1" square transducers would consume a total of 120 W and the array of two 1"×2.5" transducers would consume about 200 W.

Acoustophoretics in Settling Tank or Skimming Tank

The acoustophoretic separators described in FIGS. 3-10 can be adapted to improve the effectiveness of settling tanks and skimming tanks. The removal of dispersed particles or droplets can be enhanced using acoustophoretics. The collection of the particles or droplets within the standing waves results in coalescence of smaller particles/droplets into larger particles/droplets which are more prone to settling or floating, as the case may be. This enhances separation of the particles/droplets from the water, resulting in improved separation for a given residence time. This may also allow the tank to be of a smaller size and still achieve the same separation efficiency.

This would be accomplished with a submersible acoustophoretic separator device. The separator would include a transducer and a reflector opposite the transducer, wherein the fluid in the settling tank or the skim tank, made up of water and suspended particles or droplets, can pass between the transducer and the reflector. This permits the particles/droplets to be trapped in the standing waves thus created. In particular, it is contemplated that the submersible acoustophoretic separator can loiter or float at the top of the tank and cause particles having a diameter of 100 micrometers (μm) or less to agglomerate and precipitate out. It should be noted that only the transducer and the reflector need to be submerged, and the term "submersible" should not be construed to require that the entire device be under the surface of the water. For example, portions of the device can float on the surface. The electrical components of the device would be fully insulated.

Figure 11:
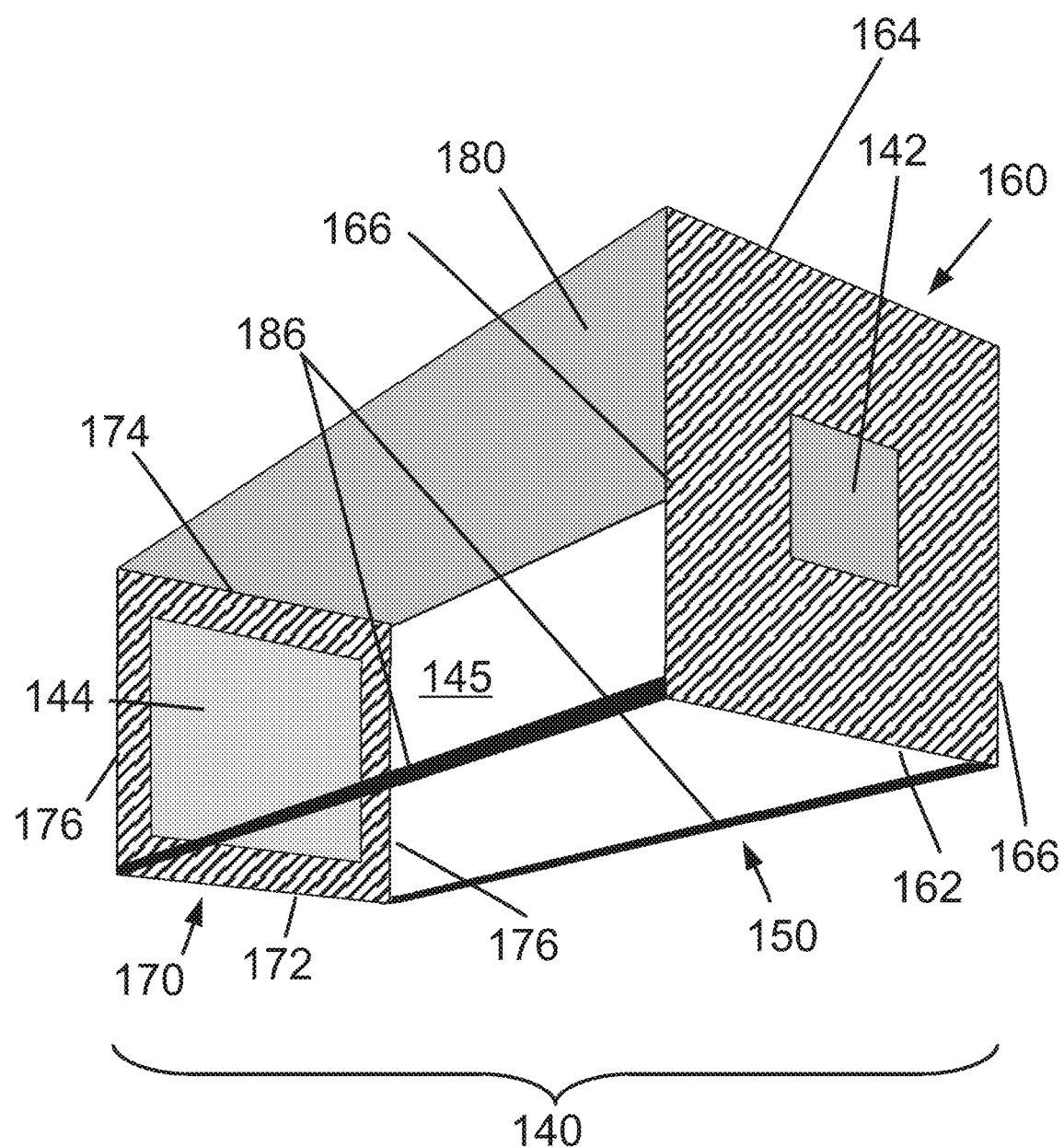
FIG. 11 is a perspective view of one exemplary embodiment of a submersible acoustophoretic separator of the present disclosure, which can be used to cause agglomeration of suspended particles which then sink to the bottom of the tank.

FIG. 11 shows a first exemplary embodiment of a submersible acoustophoretic separator 140 that is useful for agglomerating suspended particles into larger agglomerates that can then settle to the bottom of the tank due to gravity. Generally speaking, the separator 140 includes a housing 150 that has a transducer face 160 and a reflector face 170 opposite the transducer face. The transducer face 160 has an upper edge 164, a lower edge 162, and two side edges 166. Similarly, the reflector face 170 has an upper edge 174, a lower edge 172, and two side edges 176. A transducer 142 is mounted in the transducer face 160. A reflector 144 is mounted in the reflector face 170. A separation area 145 is formed in the space between the two faces, and is the location where the standing waves are formed and where droplet separation from the fluid occurs. It should be noted that the transducer face and the reflector face are depicted as square, though they can be of any shape, e.g. circular, triangular, etc., and need only to be of the proper size to accommodate the transducer and the reflector.

One or more supports join the transducer face and the reflector face together. Two different types of supports are shown here. First, an upper support structure 180 connects the upper edge 164 of the transducer face to the upper edge 174 of the reflector face. Second, support rods 186 connect the lower edge 162 of the transducer face to the lower edge 172 of the reflector face at the corners of the two faces. These supports can be used independently of each other, and in greater numbers as desired. For example, a lower support structure could be used instead of the two support rods illustrated here, or four support rods (one in each corner) could be used instead of an upper support structure.

In some embodiments, the upper support structure 180 is made from two adjustable plates that can slide relative to each other, allowing the distance between the transducer 142 and the reflector 144 to be adjusted. Similarly, the support rods can be telescoping or otherwise adjustable in length as well. This can be advantageous in customizing the separator to be used in different fluids or with different suspended particles or droplets, as such adjustment can be used to change the properties of the standing waves.

It should be noted that the sides and the bottom of the submersible acoustophoretic separator are open. Put another way, the separator 140 is illustrated with three exposed or open faces, which faces are denoted with white shading (compare to upper support structure 180, which could be considered an unexposed or closed face, as denoted by gray shading). Two of the exposed faces are between the side edges of the transducer face and the reflector face and are defined along their edges by the upper support structure 180, the side edges 176 of the reflector face 170, the side edges 166 of the transducer face 160, and support rods 186. The third exposed face is between the lower edges 162, 172 of the transducer face 160 and the reflector face 170, respectively. Generally, the submersible separator has at least one exposed face. In particular embodiments with only one exposed face, the exposed face is either a top face or a bottom face. That is, as used herein, the term "exposed face(s)" refers to face(s) that allow fluid to freely enter and/or exit the separation area 145, so that the suspended droplets can be trapped in standing waves and separated from the water. The exposed bottom face here also allows the agglomerated particles in the standing waves to escape the separator once they are of sufficient size to sink to the bottom of the tank. In embodiments including an exposed top face, the exposed top face can also allow material less dense than water (e.g., droplets) that is agglomerated in the standing waves to escape the separator once the agglomerated material is of sufficient size to rise to the top of the tank.

The orientation of the submersible acoustophoretic separator in the fluid of the tank is generally not important, as long as larger particles/droplets can escape the standing waves without being trapped on the housing. However, the housing can be designed to take any particularly desired orientation. For example, if it is desired to make the upper edge 164 a top edge (i.e. always on top) and the lower edge 164 a bottom edge, this could be achieved by making the upper support structure 180 lighter than the support rods 186, for example by placing air pockets in the support structure. Alternatively, a flotation device could be attached to the upper edges of the transducer face 160 and the reflector face 170 to make the top lighter than the bottom.

As illustrated in FIG. 11, the separator 140 is designed for the separation of suspended solids. For the separation of oil droplets, the separator 140 may be flipped upside down, such that the exposed face is on the top of the housing.

Figure 12:
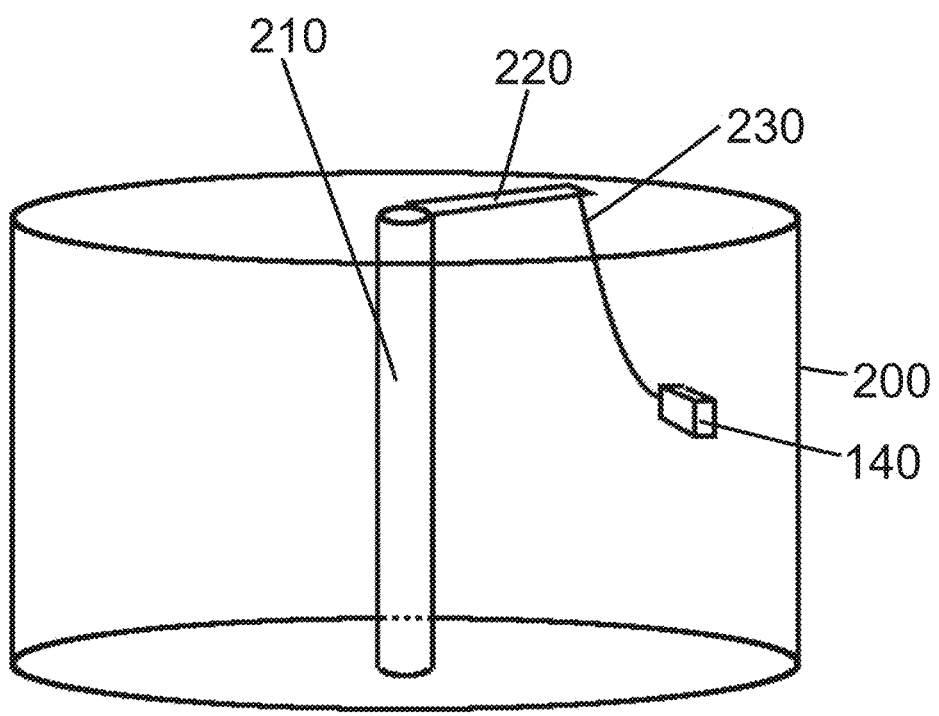
FIG. 12 is a diagram illustrating a submersible acoustophoretic separator suspended from a boom in a tank.

FIG. 12 illustrates one way in which the separator 140 can be used. Here, the tank 200 includes a central support 210 and a skimming arm 220 which rotates about the central support. The separator 140 is powered by and connected to the skimming arm by a power cable 230. The skimming arm acts as a boom, and the separator is suspended from the boom. This movement causes fresh fluid to enter the separator so that the suspended particles can be removed from the fluid and agglomerated. While the separator is depicted here on a relatively long cable in the middle of the tank, of course the separator could be attached to the skimming arm itself, or the cable could be made much shorter, to bring the separator closer to the top of the fluid. The separator could also be made stationary, with fluid being circulated in the tank to move fluid through the separator and permit agglomeration.

Figure 13:
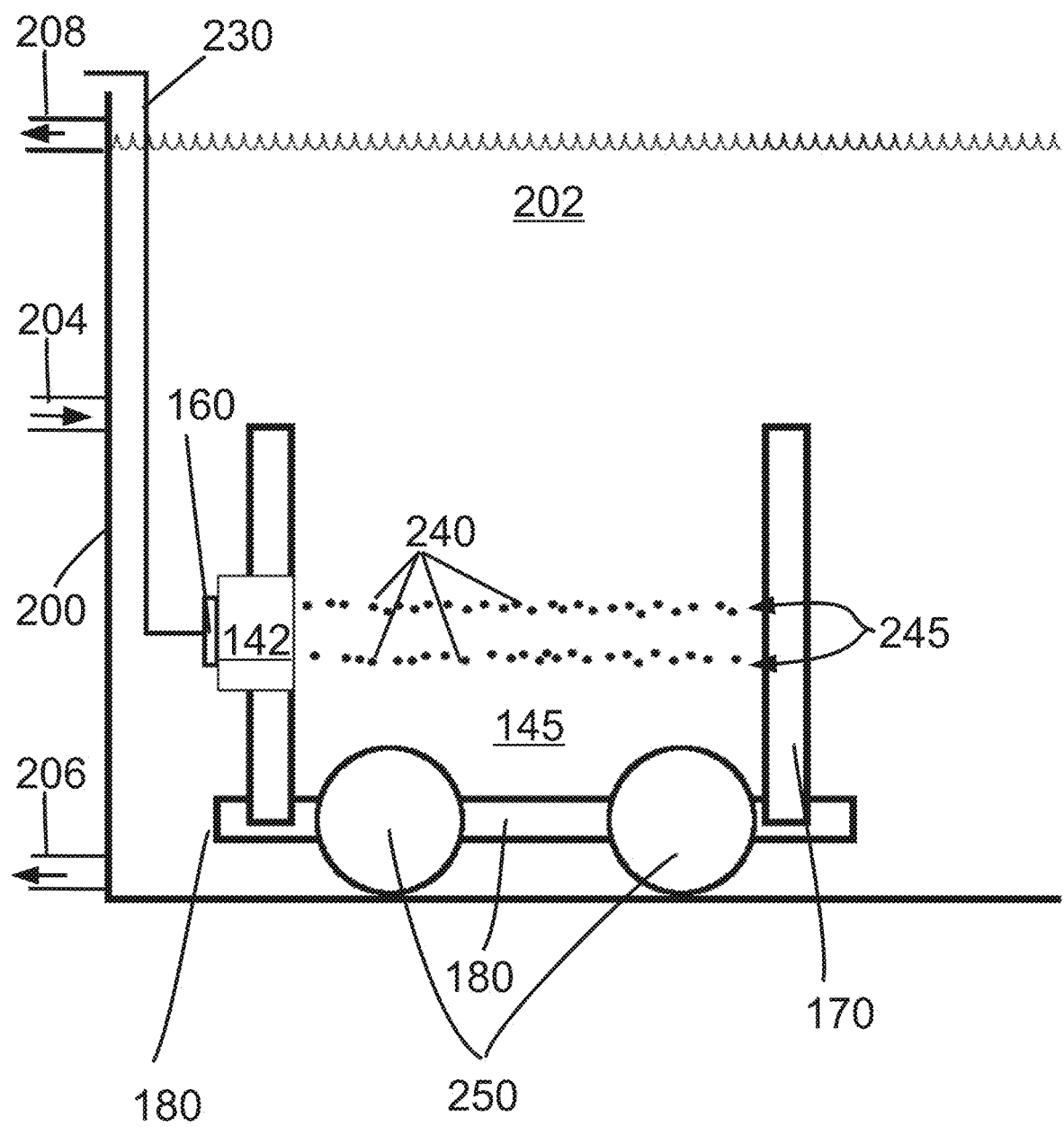
FIG. 13 is a side view of a second exemplary embodiment of a submersible acoustophoretic separator of the present disclosure, having wheels for self-locomotion and used for coalescing droplets that can then rise to the top of the tank.

Another exemplary embodiment of an acoustophoretic separator device 140 is shown in FIG. 13. Compared to FIG. 11, this separator is turned upside down and is used in coalescing oil droplets for floating to the top of the tank. Here, the separator 140 is submerged in a tank 200 containing fluid 202 (not shown to scale). The tank includes an influent line 204 through which the water/oil mixture enters, a water effluent line 206 at the bottom of the tank, and an oil effluent line 208 at the top of the tank. The skimming arm is not illustrated.

Again, the separator includes the transducer face 160 with transducer 142, the reflector face 170 with reflector (not shown), and the lower support structure 180. The sides and the top of the separator are open and exposed to the fluid. In the separation area 145, small droplets 240 are trapped at the nodes 245 of the standing waves and coalesce, allowing buoyant particles to float to the top.

In the embodiment illustrated here, the separator is mobile and may be self-propelled. The separator has wheels 250 (or treads) mounted upon the lower support structure 180 which propel the separator around the tank. This allows the separator to move throughout the entire settling zone of the tank and continuously expose itself to relatively high concentrations of dispersed oil droplets, rather than being fixed in one location whose concentration of droplets is eventually depleted.

As illustrated, power is supplied by a waterproof electrical cable 230 which connects to the transducer face 160. The watertight electrical housing may contain an electrical connector such as a BNC cable. It is also contemplated that the separator could have an independent power source, e.g. a battery.

Figure 14:
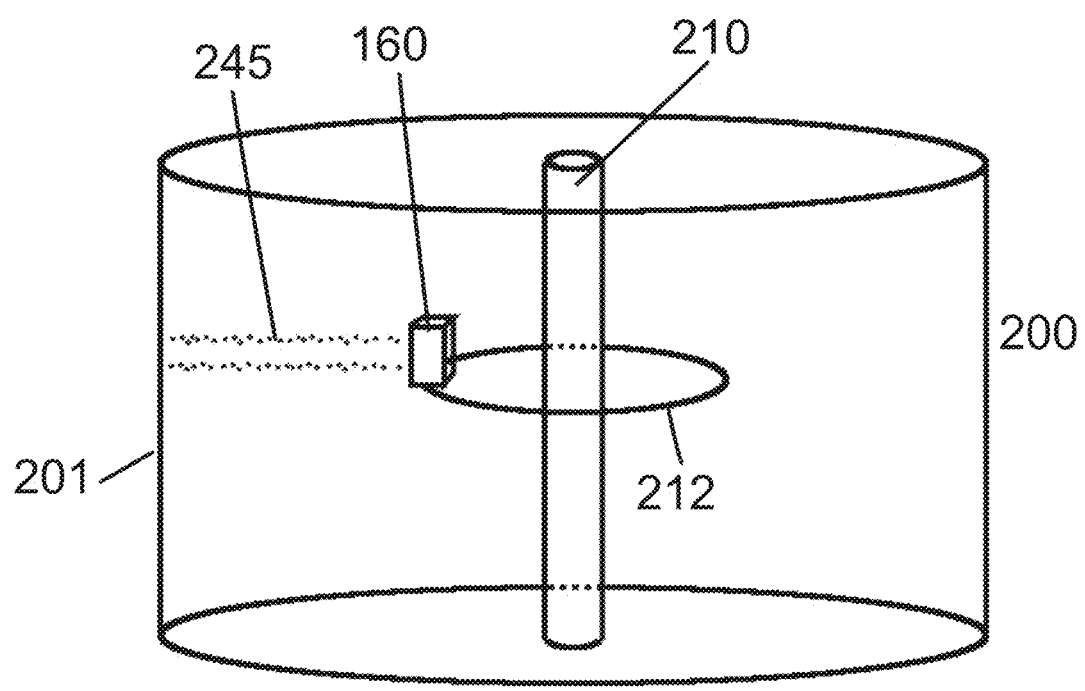
FIG. 14 is a side view of a third exemplary embodiment of a submersible acoustophoretic separator of the present disclosure, wherein the transducer is mounted on a track and the wall of the tank acts as the reflector.

FIG. 14 illustrates another exemplary embodiment of the acoustophoretic separator. Here, the wall 201 of the tank 200 acts as the reflector for the separator. The transducer face 160 containing the transducer is mounted upon a track 212, which is shown here as being mounted on the central support 210. It is contemplated that the standing waves are formed between the transducer and the tank wall 201, forming the nodal lines 245 where the particles/droplets are agglomerated/coalesced.

Figure 15:
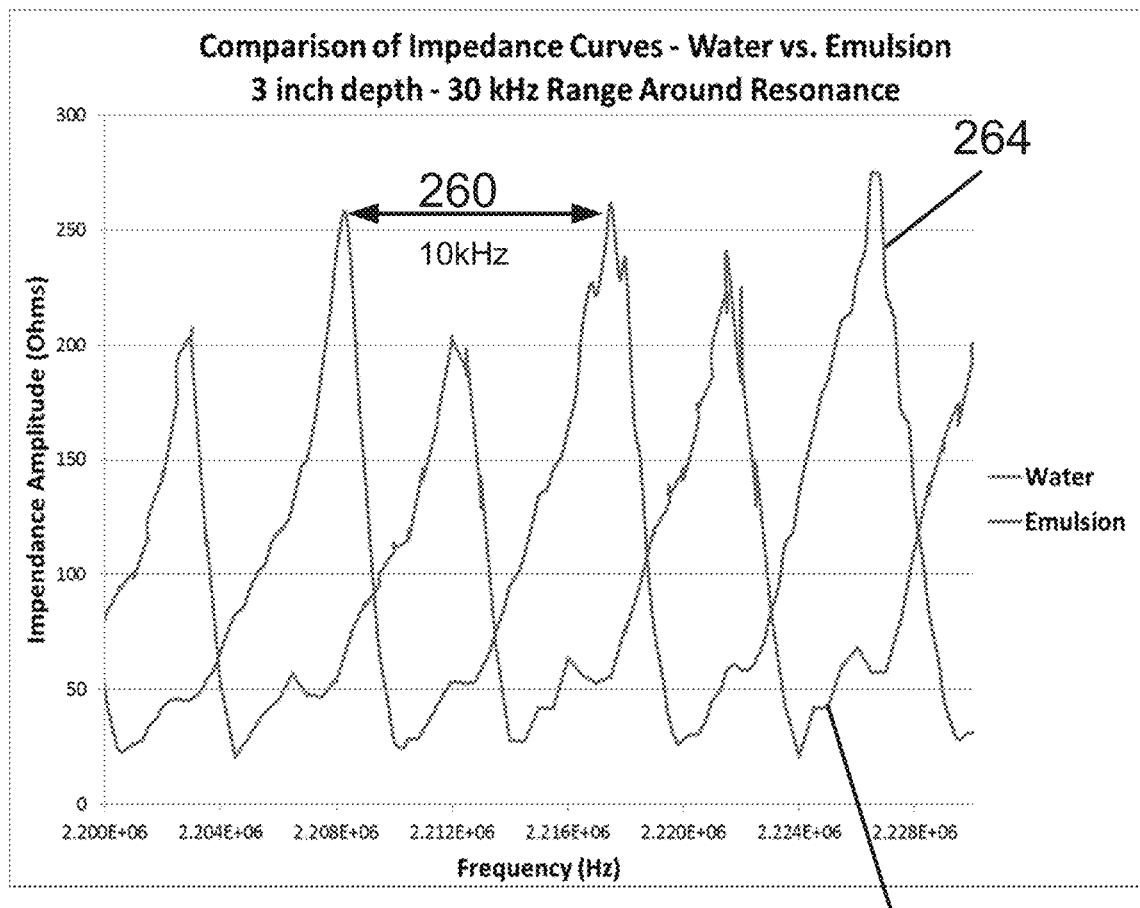
FIG. 15 is a graph of impedance amplitude vs. frequency for water and an emulsion, showing a shift in resonance frequency.

FIG. 15 is a graph of impedance amplitude versus frequency, and helps illustrate why adjusting the distance between the transducer and the reflector may be helpful. One line 262 is for water, and one line 264 is for an oil/water emulsion. The water line has three peaks at roughly 2.208 MHz, 2.218 MHz, and 2.226 MHz, and around 250 ohms amplitude. The emulsion line has three peaks at roughly 2.202 MHz, 2.212 MHz, and 2.230 MHz with an amplitude of about 200 ohms, and a fourth peak at about 2.222 MHz with an amplitude of around 240 ohms. As seen here, a shift in impedance amplitude occurs due to changes in the speed of sound of the emulsion. The arrow 260 indicates 10 kHz modulations, the distance between resonance frequencies (the peaks). Because of this shift in impedance, a change in reflector distance is useful for different emulsion concentrations. Larger shifts will occur with higher emulsion concentrations.

In experiments in which there was no agitation of the tank to simulate actual settling tank conditions, particles were first visible after three minutes of operation. In the experimental setup, the system used a 1 inch PZT-8 2 MHz transducer with interchangeable round and square transducers. The adjustable reflector was stainless steel and air backed. The support structure had grooves to adjust the distance to 3 inches, 6 inches, and 12 inches. The shorter reflector distances were more effective in this setup. The tested emulsion was water and SAE-30 motor oil at a concentration of 400 ppm, having a density of 888 kg/m$^3$. Droplets ranged from 2 to 25 microns. The droplets were created by shearing oil droplets in a pump. If left unagitated, the emulsion was stable over several days. After the particles became visible at the standing waves after 3 minutes, the oil droplets reached critical mass and were released after 15 minutes (the buoyancy of the oil droplets was sufficient to cause the oil to float to the top). Particle collection showed accumulations through 45 minutes. Once the acoustics were turned off, the captured droplets rose to the surface. In some embodiments, an acoustic separator having an on/off cycle of several minutes is contemplated. The testing frequency was 2.2163 MHz.

The open-style system was shown to be feasible, with oil droplets able to reach a critical mass and rise to the top. The fluid circulation increased the particle capture rate. Shorter reflector distances generally provided better separation.

Acoustophoretics in Bioreactors

Another specific application for the acoustophoresis devices of the present disclosure is in the processing of bioreactor materials. In this regard, it is to be understood that a bioreactor may be used in place of the settling or skimming tanks or vessels previously described.

Bioreactors are useful for making biomolecules such as recombinant proteins or monoclonal antibodies. Very generally, cells are cultured in a bioreactor vessel with media in order to produce the desired product, and the desired product is then harvested by separation from the cells and media. The use of mammalian cell cultures including Chinese hamster ovary (CHO), NS0 hybridoma cells, baby hamster kidney (BHK) cells, and human cells has proven to be a very efficacious way of producing/expressing the recombinant proteins and monoclonal antibodies used in pharmaceuticals.

The filtering devices of the present disclosure, which use ultrasonic transducers and acoustophoresis, can also improve the dewatering of the leftover material from a bioreactor batch (i.e bioreactor sludge), and thus reduce the use of or eliminate the use of disk stack centrifuges. This use or application of ultrasonic transducers and acoustophoresis simplifies processing and reduces costs.

In a perfusion bioreactor system, it is desirable to be able to filter and separate the cells and cell debris from the expressed materials that are in the fluid stream (i.e. cell culture media). The expressed materials are composed of biomolecules such as recombinant proteins or monoclonal antibodies, and are the desired product to be recovered.

An acoustophoretic filtering device can be used in at least two different ways. First, the standing waves can be used to trap the expressed biomolecules and separate this desired product from the cells, cell debris, and media. The expressed biomolecules can then be diverted and collected for further processing. Alternatively, the standing waves can be used to trap the cells and cell debris present in the cell culture media. The cells and cell debris, having a positive contrast factor, move to the nodes (as opposed to the anti-nodes) of the standing wave. As the cells and cell debris agglomerate at the nodes of the standing wave, there is also a physical scrubbing of the cell culture media that occurs whereby more cells are trapped as they come in contact with the cells that are already held within the standing wave. This generally separates the cells and cellular debris from the cell culture media. When the cells in the standing wave agglomerate to the extent where the mass is no longer able to be held by the acoustic wave, the aggregated cells and cellular debris that have been trapped can fall out of the fluid stream through gravity, and can be collected separately. To aid this gravitational settling of the cells and cell debris, the standing wave may be interrupted to allow all of the cells to fall out of the fluid stream that is being filtered. This process can be useful for dewatering. The expressed biomolecules may have been removed beforehand, or remain in the fluid stream (i.e. cell culture medium).

Desirably, the ultrasonic transducer(s) generate a multi-dimensional (e.g., three-dimensional) standing wave in the fluid that exerts a lateral force on the suspended particles to accompany the axial force so as to increase the particle trapping capabilities of the acoustophoretic filtering device. Typical results published in literature state that the lateral force is two orders of magnitude smaller than the axial force. In contrast, the technology disclosed in this application provides for a lateral force to be of the same order of magnitude as the axial force.

In the present disclosure, a perfusion bioreactor can also be used to generate cells that can subsequently be used for cell therapy. In this type of process, the biological cells to be used in the cell therapy are cultured in the bioreactor and expanded (i.e. to increase the number of cells in the bioreactor through cell reproduction). These cells may be lymphocytes such as T cells (e.g., regulatory T-cells (Tregs), Jurkat T-cells), B cells, or NK cells; their precursors, such as peripheral blood mononuclear cells (PBMCs); and the like. The cell culture media (aka host fluid), containing some cells, is then sent to a filtering device that produces an acoustic standing wave. A portion of the cells are trapped and held in the acoustic standing wave, while the remaining host fluid and other cells in the host fluid are returned to the bioreactor. As the quantity of trapped cells increases, they form larger clusters that will fall out of the acoustic standing wave at a critical size due to gravity forces. The clusters can fall into a product outlet outside a region of the acoustic standing wave, such as below the acoustic standing wave, from which the cells can be recovered for use in cell therapy. Only a small portion of the cells are trapped and removed from the bioreactor via the product outlet, and the remainder continue to reproduce in the bioreactor, allowing for continuous production and recovery of the desired cells.

In another application, acoustic standing waves are used to trap and hold biological cells and to separate viruses (e.g. lentiviruses) or exosomes that are produced by the biological cells. In these embodiments, the biological cells are returned to the bioreactor post-separation to continue production of viruses or exosomes.

In these applications, the acoustic filtering devices of the present disclosure can act as a cell retention device. The acoustic cell retention systems described herein operate over a range of cell recirculation rates, efficiently retain cells over a range of perfusion (or media removal) rates, and can be tuned to fully retain or selectively pass some percentage of cells through fluid flow rate, transducer power or frequency manipulation. Power and flow rates can all be monitored and used as feedback in an automated control system.

The cells of interest may also be held in the flow chamber of the external filtering device through the use of an acoustic standing wave such that other moieties may be introduced in close proximity to and for the purpose of changing the target cells. Such an operation would include the trapping of T cells and the subsequent introduction of modified lentivirus materials with a specific gene splice such that the lentivirus with a specific gene splice will transfect the T cell and generate a chimeric antigen receptor T cell also known as a CAR-T cell.

It is desirable to filter as much as possible or all of the cells and cell debris from the expressed materials that are in the fluid stream. The expressed materials are composed of biomolecules, such as recombinant proteins or monoclonal antibodies, or cells and are the desired product to be recovered. Through the use of acoustophoresis, the separation of the cells and cell debris is very efficient and leads to very little loss of the expressed materials or cells. This separation technique is an improvement over previous or conventional filtration processes (depth filtration, tangential flow filtration, centrifugation), which show limited efficiencies at high cell densities, where the loss of the expressed materials in the filter beds themselves can be up to 5% of the materials produced by the bioreactor. The use of mammalian cell cultures including Chinese hamster ovary (CHO), NS0 hybridoma cells, baby hamster kidney (BHK) cells, and human cells has proven to be a very efficacious way of producing/expressing the recombinant proteins and monoclonal antibodies used in today's pharmaceuticals. The filtration of the mammalian cells and the mammalian cell debris through acoustophoresis aids in greatly increasing the yield of the bioreactor. The acoustophoresis techniques discussed herein permit the cells and/or their expressed materials, to be recovered.

In certain embodiments, the acoustophoretic systems described herein can be used with bioreactors, such as in a perfusion process, to produce biomolecules such as recombinant proteins or monoclonal antibodies, and to separate these desirable products from a cell culture in the bioreactor A new mixture with an increased concentration of particles is obtained, or the particles themselves can be obtained or a clarified fluid containing biomolecules, such as recombinant proteins or monoclonal antibodies, may be produced. In more specific embodiments, the particles are biological cells, such as Chinese hamster ovary (CHO) cells, NS0 hybridoma cells, baby hamster kidney (BHK) cells, or human cells; lymphocytes such as T cells (e.g., regulatory T-cells (Tregs), Jurkat T-cells), B cells, or NK cells; their precursors, such as peripheral blood mononuclear cells (PBMCs); algae or other plant cells, bacteria, viruses, or microcarriers. The acoustophoretic systems described herein are scalable and are generally useful for cell densities from about $0.5 \times 10^6$ cells/mL to about $50 \times 10^6$ cells/mL. Several different types of acoustophoretic systems are described herein.

A separate aspect of the use of high cell concentration bioreactors is the "dewatering" of the materials at the end of a bioreactor run. The "dewatering" or removal of interstitial fluid from a bioreactor sludge is important for improving the efficiency of recovery of the intended bioreactor product. Currently, high energy centrifuges with internal structures (known as disk stack centrifuges) are utilized to remove the interstitial fluid from the bioreactor sludge at the end of a run. The capital cost and operating costs for a disk stack centrifuge is high. A simpler method of removing the interstitial fluid from the remaining bioreactor sludge that can be performed without the high capital and operating costs associated with disk stack centrifuges is desirable. In addition, current methods of filtration or centrifugation can damage cells, releasing protein debris and enzymes into the purification process and increasing the load on downstream portions of the purification system.

Figure 16:
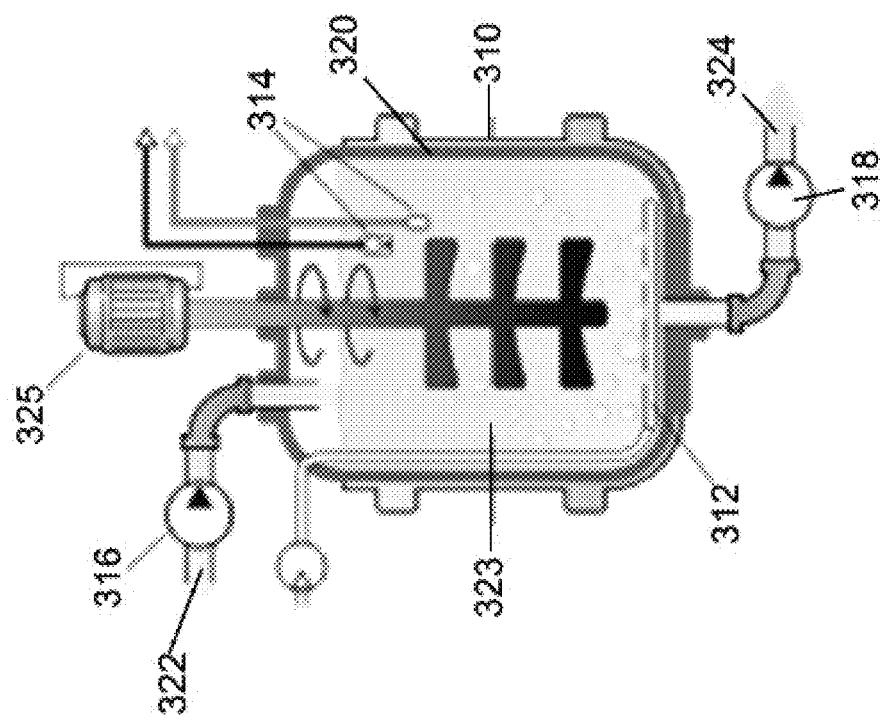
FIG. 16 is a cross-sectional view that shows the various components of a bioreactor.

FIG. 16 is a cross-sectional view of a generic bioreactor 300 that is useful for the systems of the present disclosure. As illustrated here, the bioreactor includes a reaction vessel 320 having an internal volume 323. A feed inlet 322 at the top of the vessel is used to feed cell culture media into the vessel. An agitator 325 is present. Here, the agitator is depicted as a set of rotating blades, though any type of system that causes circulation is contemplated. An outlet 324 is shown at the bottom of the vessel. A thermal jacket 310 surrounds the reaction vessel, and is used to regulate the temperature of the cells/media. An aerator 312 is located on the bottom of the vessel for providing gas to the internal volume. Sensors 314 are shown at the top right of the vessel. A pump 316 is illustrated for feeding the cell culture media into the vessel, as is another pump 318 for removing cell culture media from the vessel. An interior light source for illuminating the internal volume may be present, for example when the bioreactor is used for growing plant cells.

The bioreactor permits growth of a seed culture through a growth/production cycle, during which time debris, waste and unusable cells will accumulate in the bioreactor and the desired product (e.g. biomolecules such as monoclonal antibodies, recombinant proteins, hormones, other cells, etc.) will be produced as well. The desired product can be harvested at the end of the production cycle (e.g. a fed-batch bioreactor) or continuously (e.g. a perfusion bioreactor).

The perfusion systems of the present disclosure also use an acoustophoretic filtering device. The contents of the bioreactor are continuously flowed through the filtering device to capture the desired products.

Figure 17:
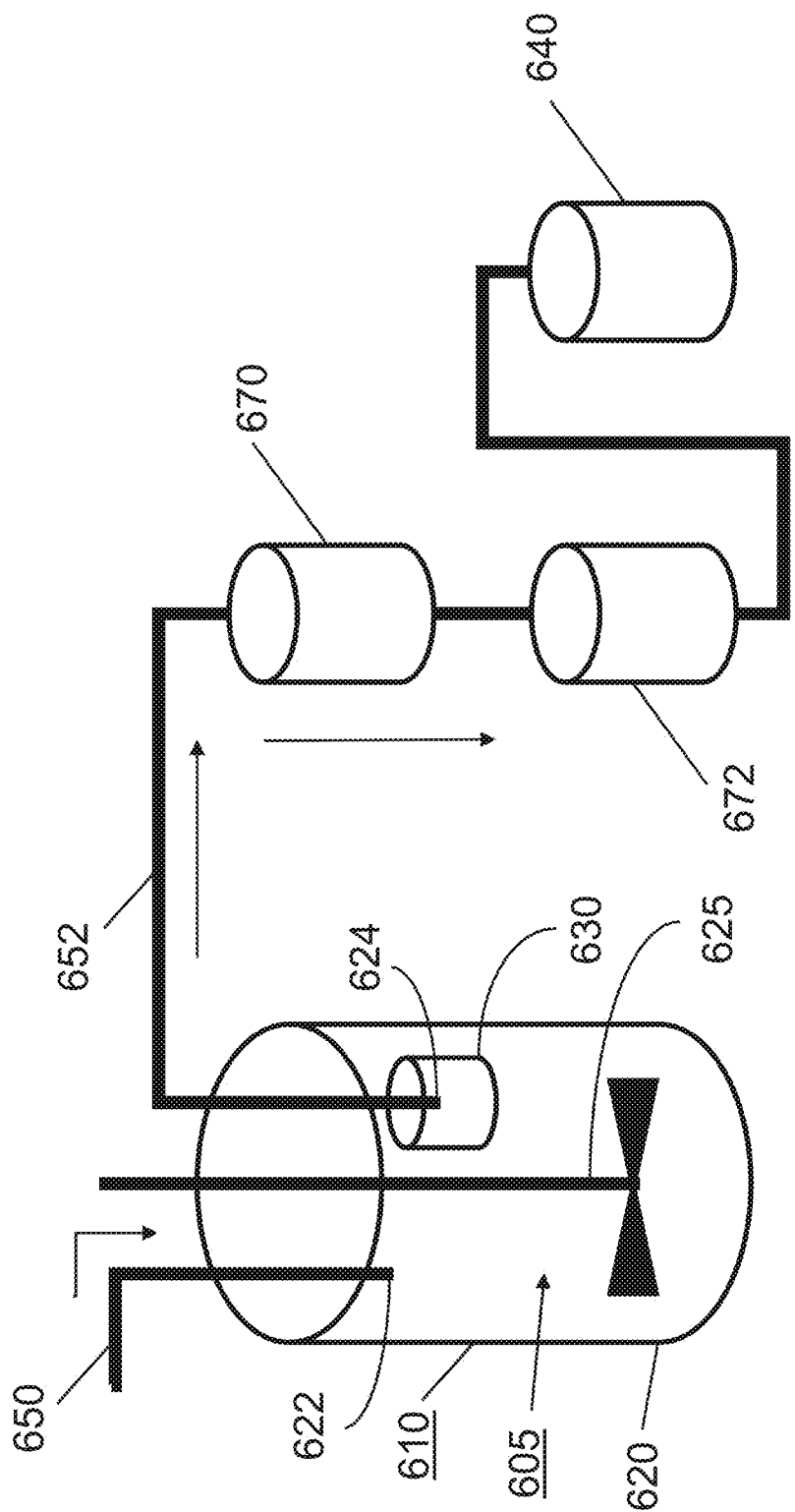
FIG. 17 is a schematic view illustrating a system of the present disclosure, including a bioreactor with a submersible acoustophoretic separator and filtrations stages/steps located downstream of the submersible acoustophoretic separator.

FIG. 17 illustrates an exemplary processing system of the present disclosure, comprising a bioreactor 610 and a submersible acoustophoretic separator 630, a downstream porous filter stage 670, and a downstream separation column filtration stage 672. These filtering stages 660, 670, 672 are arranged in series. The bioreactor 610 includes a reaction vessel 620 having a feed inlet 622, and an outlet 624. Media is added into the feed inlet 622 by an addition pipe 650. The contents of the reaction vessel (reference numeral 605) are mixed with an agitator 625. The desired product (e.g. recombinant proteins, viruses, exosomes, or additional cells) is continuously produced by the cells located within the vessel 620, and are present in the media of the bioreactor. The product and the cells in the bioreactor enter the acoustophoretic filtering device 630. There, denser material is separated through the use of multi-dimensional standing waves. The desired product can be drawn off through outlet 624 and pipe 654 into a containment vessel 640. The 3-D standing waves of the acoustophoresis device allow for high throughput due to the increased lateral trapping force of the 3-D standing waves. It is noted that although the reaction vessel outlet 624 is depicted at the top of the vessel, that the outlet can be placed in any desired location. This may depend on the desired product to be obtained.

It is contemplated that the systems of the present disclosure may include a filter "train," in which multiple different filtration steps are used to clarify or purify an initial fluid/particle mixture to obtain the desired product and manage different materials from each filtration step. Each filtration step can be optimized to remove a particular material, improving the overall efficiency of the clarification process. An individual acoustophoretic device can operate as one or multiple filtration steps. For example, each individual ultrasonic transducer within a particular acoustophoretic device can be operated to trap materials within a given particle range. The acoustophoretic device can be used to remove large quantities of material, reducing the burden on subsequent downstream filtration steps/stages. Additional filtration steps/stages can be placed downstream of the acoustophoretic device, such as physical filters or other filtration mechanisms known in the art, such as depth filters (e.g., polymeric morphology, matrix media adsorption), sterile filters, crossflow filters (e.g., hollow fiber filter cartridges), tangential flow filters (e.g., tangential flow filtration cassettes), adsorption columns, separation columns (e.g., chromatography columns), or centrifuges. Multiple acoustophoretic devices or techniques can be used as well. It is particularly contemplated that desirable biomolecules or cells can be recovered/separated after such filtration/purification, as explained herein.

The outlets of the bioreactors/tanks/vessels of the present disclosure (e.g. permeate, concentrate, and flow outlets) can be fluidly connected to any other filtration step or filtration stage. Similarly, the inlets of the acoustophoretic separators/filtering devices of the present disclosure may be fluidly connected to any other filtration step or filtration stage. That is, it is specifically contemplated that the additional filtration steps/stages may be located upstream (i.e., between the acoustophoretic separators(s) and the bioreactor), downstream, or both upstream and downstream of the acoustophoretic separators(s). The additional filtration stages discussed above may also be used in series or parallel with one or more acoustophoretic devices or techniques. In particular, it is to be understood that the acoustophoretic separators of the present disclosure can be used in a system in combination with as few or as many filtration stages/steps located upstream or downstream thereof, or in series or parallel, or in single or multiple combinations as is desired. For avoidance of doubt, it is contemplated that the present systems and/or techniques can include a bioreactor, one or more acoustophoretic separator/filtering devices or techniques, and one or more filtrations stages/steps located upstream and/or downstream of the acoustophoretic separator, with the filtrations stage(s) and acoustophoretic separator(s) arranged in serial or parallel and fluidly connected to one another. For example, FIG. 17 schematically illustrates such a system, including a bioreactor 610, a submersible acoustophoretic separator 630, a downstream porous filter stage 670, and a downstream separation column filtration stage 672. These filtering stages 630, 670, 672 are arranged in series.

For example, when it is desired that the system include a filtration stage (e.g., a separation column) located downstream of the acoustophoretic separator, the outlet of the bioreactor can lead to an inlet of the separation column, with the separation column further processing the fluid therein.

Filtration steps/stages can include various techniques or methods such as an additional acoustophoretic separator/filtering device, or physical filtration means such as depth filtration, sterile filtration, size exclusion filtration, or tangential filtration. Depth filtration uses physical porous filtration mediums that can retain material through the entire depth of the filter. In sterile filtration, membrane filters with extremely small pore sizes are used to remove microorganisms and viruses, generally without heat or irradiation or exposure to chemicals. Size exclusion filtration separates materials by size and/or molecular weight using physical filters with pores of given size. In tangential filtration, the majority of fluid flow is across the surface of the filter, rather than into the filter.

Chromatography can be used, including cationic chromatography columns, anionic chromatography columns, affinity chromatography columns, and/or mixed bed chromatography columns. Other hydrophilic/hydrophobic processes can be used for filtration purposes.

Secondary depth filtration product selection can be achieved with some screening of the material to be filtered. In a typical fed-batch culture of a CHO—S based cell line expressing a humanised IgG1 mAb, depth filters having total volumes of less than about 5 L to less than about 25 L and total areas of about 0.002 $m^2$ to about 0.1 $m^2$ can be used for secondary depth filtration. In this regard, suitable depth filters include the Supracap™ HP depth filter capsules available from Pall Corporation. Post clarification, the harvested cell culture fluid (HCCF) may be optionally stored, filtered to control the bioburden, and stored or filtered to control the bioburden and be processed chromatographically. In a typical fed-batch culture of a CHO—S based cell line expressing a humanised IgG1 mAb, the sterile filters (i.e., sterilizing-grade membrane filters) having total volumes of less than about 5 L to less than about 25 L and total areas of about 220 $cm^2$ to about 375 $cm^2$ can be used. In this regard, suitable sterile filters include the Kleencar® capsules and mini Kleenpak capsules available from Pall Corporation.

Tertiary depth filtration may optionally be omitted at small scale, but, when used, can prevent fouling of subsequent filters and allow for a reduction in size of the bioburden control filter. In a typical fed-batch culture of a CHO—S based cell line expressing a humanised IgG1 mAb, the same depth filters used for secondary depth filtration can be used for tertiary depth filtration. Post clarification, the same sterile filters as described above can be used.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner.

Specific details are given in the description to provide a thorough understanding of example configurations (including implementations). However, configurations may be practiced without these specific details. For example, well-known processes, structures, and techniques have been shown without unnecessary detail to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional stages or functions not included in the figure.

Having described several example configurations, various modifications, alternative constructions, and equivalents may be used without departing from the scope of the disclosure. For example, the above elements may be components of a larger system, wherein other structures or processes may take precedence over or otherwise modify the application of the invention. Also, a number of operations may be undertaken before, during, or after the above elements are considered. Accordingly, the above description does not bound the scope of the claims.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

The invention claimed is:

1. A method of separation in a bioreactor, the method comprising:

placing a submersible acoustophoretic separator in the bioreactor, the submersible acoustophoretic separator including a transducer and a reflector;

providing a host fluid in the bioreactor, the host fluid including particles or droplets;

exciting the transducer to generate a higher order mode shape to generate an acoustic wave in the host fluid; and reflecting the acoustic wave from the reflector to generate a multidimensional acoustic standing wave between the transducer and the reflector, wherein the host fluid is separated from the particles or droplets by the multidimensional acoustic standing wave.

2. The method of claim 1, wherein the acoustophoretic separator has (i) a housing with (a) the transducer on a transducer face, (b) the reflector on a reflector face opposite the transducer face, (c) a support joining the transducer face and the reflector face, and (d) at least one exposed face that allows fluid to enter a separation area located between the transducer face and the reflector face.

3. The method of claim 2, wherein the support is a set of telescoping support rods connecting a lower edge of the transducer face to a lower edge of the reflector face.

4. The method of claim 2, wherein the support is an upper support structure connecting an upper edge of the transducer face to an upper edge of the reflector face.

5. The method of claim 2, wherein the housing includes wheels or treads for propelling the separator on the bottom of the bioreactor.

6. The method of claim 1, wherein the standing wave creates nodal lines and lateral forces that trap the particles or droplets in the nodal lines, and wherein the particles or droplets trapped in the nodal lines coalesce or agglomerate such that the particles or droplets are separated from the fluid.

7. The method of claim 6, wherein the submersible acoustophoretic separator includes at least one exposed face that allows fluid to enter a separation area located between the transducer and the reflector, and wherein the at least one exposed face of the submersible acoustophoretic separator is a top face or a bottom face, the at least one exposed face allowing the trapped particles or droplets to exit the separator as they coalesce or agglomerate.

8. The method of claim 1, wherein the multidimensional acoustic standing wave results in an acoustic radiation force with an axial force component and a lateral force component that are of the same order of magnitude.

9. The method of claim 2, wherein the acoustophoretic separator includes a housing that mechanically connects the transducer and the reflector.

10. The method of claim 9, wherein the housing is adjustable to vary the distance between the transducer and the reflector.

11. The method of claim 10, wherein the support includes an upper support plate connecting an upper edge of the transducer face to an upper edge of the reflector face and support rods connecting a lower edge of the transducer face to a lower edge of the reflector face.

12. The method of claim 2, wherein:
the housing includes wheels or treads for propelling the separator on the bottom of the bioreactor; or
wherein the housing includes a flotation device; or
wherein the housing has a propulsion mechanism allowing the separator to wander in the bioreactor: or
wherein the separator is suspended from a boom that rotates about a central support.

13. The method of claim 1, wherein the submersible acoustophoretic separator further comprises a flotation device.

14. The method of claim 1, wherein the transducer creates a three-dimensional acoustic standing wave.

15. The method of claim 1, wherein the submersible acoustophoretic separator includes a total of three exposed faces that allow the host fluid and the particles or droplets to enter a separation area located between the transducer and the reflector.

16. A method of separation in a bioreactor, the method comprising:
placing a submersible acoustophoretic separator in the bioreactor, the acoustophoretic separator including (i) a housing with (a) at least one transducer and (b) at least one reflector;

wherein the bioreactor contains a host fluid and at least one secondary phase that includes particles or droplets;

wherein the transducer is composed of a piezoelectric material and the reflector is made of a high acoustic impedance material;

applying acoustic energy to the fluid with the transducer generate a higher order mode shape to generate an acoustic wave in the host fluid;

reflecting the acoustic wave from the reflector, thereby creating a multidimensional acoustic standing wave, wherein the multidimensional acoustic standing wave is exposed to the host fluid and the at least one secondary phase in the bioreactor; and separating the at least one secondary phase from the host fluid in an accelerated manner due to exposure to the multidimensional acoustic standing wave.

17. The method of claim 16, wherein the multidimensional acoustic standing wave results in an acoustic radiation force that includes an axial force component and a lateral force component that are of the same order of magnitude.

18. The method of claim 16, wherein the submersible acoustophoretic separator includes a total of three exposed faces that allow the host fluid and the at least one secondary phase to enter a separation area located between the transducer and the reflector.

19. A method of separation in a bioreactor, the method comprising:
placing an acoustophoretic separator in the bioreactor, the acoustophoretic separator including (i) a housing with (a) at least one transducer and (b) at least one reflector;

wherein the bioreactor contains (i) a host fluid and (ii) (a) dispersed particles or (b) a secondary fluid;

wherein the transducer is composed of a piezoelectric material and the reflector is made of a high acoustic impedance material;

exciting the transducer to generate a higher order mode shape to create an acoustic wave in the host fluid;

reflecting the acoustic wave from the reflector, thereby creating a multidimensional acoustic standing wave, wherein the multidimensional acoustic standing wave is exposed to the host fluid and the dispersed particles or secondary fluid in the bioreactor; and coalescing, agglomerating, or precipitating the dispersed particles or secondary fluid into larger particles or droplets so that the larger particles or droplets settle or float out of the host fluid in an accelerated manner due to exposure to the multidimensional acoustic standing wave.

20. The method of claim 19, wherein the acoustophoretic separator floats on the surface of the host fluid or wherein the acoustophoretic separator is submerged in the host fluid.

\* \* \* \* \*